United States Patent
Aguilera et al.

(10) Patent No.: US 11,907,065 B2
(45) Date of Patent: *Feb. 20, 2024

(54) RESILIENCY AND PERFORMANCE FOR CLUSTER MEMORY

(71) Applicant: VMware LLC, Palo Alto, CA (US)

(72) Inventors: Marcos K. Aguilera, Mountain View, CA (US); Keerthi Kumar, Bangalore (IN); Pramod Kumar, Bangalore (IN); Pratap Subrahmanyam, Saratoga, CA (US); Sairam Veeraswamy, Coimbatore (IN); Rajesh Venkatasubramanian, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,536

(22) Filed: Jan. 25, 2023

(65) Prior Publication Data
US 2023/0168965 A1  Jun. 1, 2023

Related U.S. Application Data

(63) Continuation of application No. 17/481,345, filed on Sep. 22, 2021.

(30) Foreign Application Priority Data

Jul. 16, 2021 (IN) .............................. 202141032022

(51) Int. Cl.
*G06F 16/2453* (2019.01)
*G06F 16/22* (2019.01)
*G06F 16/2455* (2019.01)
*G06F 16/901* (2019.01)
*G06F 9/4401* (2018.01)
*G06F 9/50* (2006.01)
(Continued)

(52) U.S. Cl.
CPC ........ *G06F 11/1068* (2013.01); *G06F 3/0619* (2013.01); *G06F 3/0659* (2013.01); *G06F 3/0673* (2013.01); *G06F 11/0772* (2013.01)

(58) Field of Classification Search
CPC . G06F 11/1068; G11C 16/10; G11C 16/0483; H03M 13/1515
See application file for complete search history.

(56) References Cited

U.S. PATENT DOCUMENTS 6,536,009 B1* 3/2003 Bodnar ............... G06F 11/1016
714/753
11,392,454 B2* 7/2022 Kim ...................... H03M 13/05
(Continued)

*Primary Examiner* — Guy J Lamarre
(74) *Attorney, Agent, or Firm* — King Intellectual Asset Management

(57) ABSTRACT

Disclosed are various embodiments for improving the resiliency and performance of clustered memory. A computing device can generate at least one parity page from at least a first local page and a second local page. The computing device can then submit a first write request for the first local page to a first one of a plurality of memory hosts. The computing device can also submit a second write request for the second local page to a second one of the plurality of memory hosts. Additionally, the computing device can submit a third write request for the parity page to a third one of the plurality of memory hosts.

20 Claims, 16 Drawing Sheets

(51) Int. Cl.
*H04L 67/10* (2022.01)
*G06F 3/06* (2006.01)
*G06F 12/0893* (2016.01)
*G06F 16/17* (2019.01)
*G06F 11/10* (2006.01)
*G06F 12/109* (2016.01)
*G06F 16/23* (2019.01)
*G06F 16/242* (2019.01)
*H03M 7/30* (2006.01)
*G06F 16/2457* (2019.01)
*G06F 16/2458* (2019.01)
*G06F 16/27* (2019.01)
*G06F 7/24* (2006.01)
*G06F 11/07* (2006.01)

(56) References Cited

U.S. PATENT DOCUMENTS

| | | | | |
|---|---|---|---|---|
| 2002/0073376 A1* | 6/2002 | Otake | ............... | H03M 13/29 |
| 2016/0080002 A1* | 3/2016 | Ramaraju | ............... | G06F 3/064 |
| | | | | 714/764 |
| 2023/0012999 A1* | 1/2023 | Aguilera | ............... | G06F 3/0619 |

* cited by examiner

RESILIENCY AND PERFORMANCE FOR CLUSTER MEMORY

CROSS-REFERENCE TO RELATED APPLICATIONS

This application is a continuation of, and claims priority to and the benefit of, copending U.S. patent application Ser. No. 17/481,345, entitled "IMPROVED RESILIENCY AND PERFORMANCE FOR CLUSTER MEMORY" and filed on Sep. 22, 2021, which claims priority to and the benefit of Indian Patent Application No. 202141032022, entitled "IMPROVED RESILIENCY AND PERFORMANCE FOR CLUSTER MEMORY" and filed on Jul. 16, 2021, each of which is incorporated by reference as if set forth herein in its entirety.

This application is also related in subject matter to U.S. patent application Ser. No. 17/481,352, U.S. patent application Ser. No. 17/481,418, and U.S. patent application Ser. No. 17/481,335, each of which is incorporated by reference as if set forth herein in its entirety.

BACKGROUND

Computing devices often require increasing amounts of memory in order to provide acceptable performance for applications executing on the computing device. However, the cost of memory can be expensive, and there is no guarantee that additional memory installed on any particular computing device in a computing cluster will be utilized. To improve the efficiency of memory utilization, additional memory may be installed in a pool of memory servers. Computing devices that need to utilize additional memory can then store data to or retrieve data from the memory servers. When low-latency, high-speed interconnects are used in combination with protocols such as remote direct memory access (RDMA), storing data using a memory server can offer higher performance than writing data to disk. However, using the memory server would still be slower than reading from or writing to the local memory of a computing device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for improving the resilience and performance of clustered memory. While clustered memory is useful for efficiently providing additional memory resources to computing devices that need them, clustered memory also faces several problems. First, accesses of clustered memory are often both higher latency and have lower bandwidth compared to memory installed locally on a computing device. Second, memory servers that provide clustered memory resources are susceptible to failure (e.g., because of a hardware or component failure, software crash, human error, etc.). If a memory server providing clustered memory to a computing device were to fail, the contents of the clustered memory would no longer be available to the computing device. This could cause the computing device to crash because computing devices are generally not designed to handle cases where parts of the available memory disappear in the middle of execution.

However, the various embodiments of the present disclosure address these deficiencies in a number of ways. First, several embodiments of the present disclosure provide redundancy for clustered memory, allowing for a computing device to continue operation even in the event of a failure of a memory server. Second, several embodiments of the present disclosure improve the latency and bandwidth constraints of clustered memory implementations.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
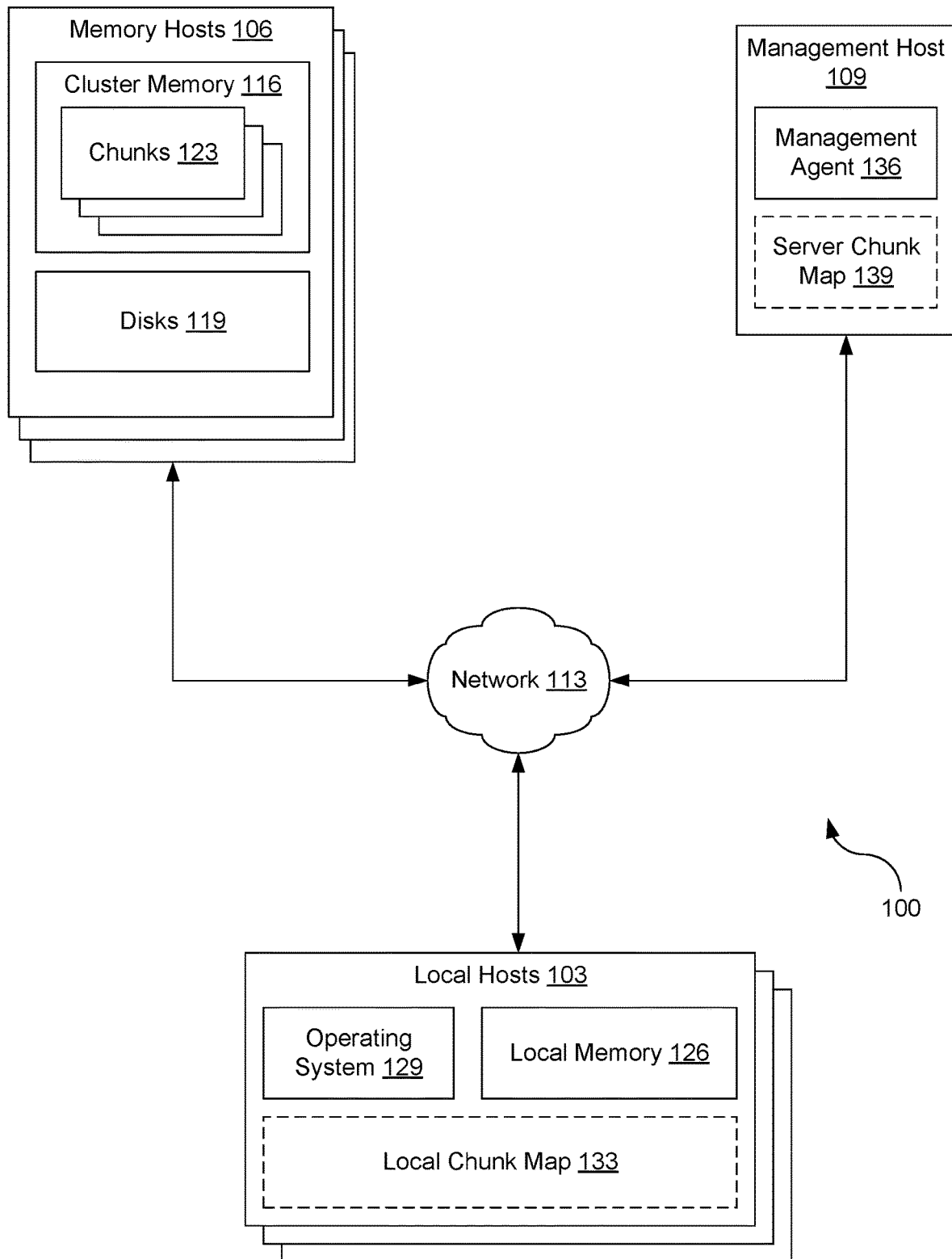
FIG. 1 is a drawing of a network environment according to various embodiments of the present disclosure.

FIG. 1 shows a network environment 100 according to various embodiments. The network environment 100 can include one or more local hosts 103, one or more memory hosts 106, and a management host 109, which can be in data communication with each other via a network 113. Computing devices such as the local host 103, memory hosts 106, and the management host 109 can include a processor, a memory, one or more disks, and/or a network interface.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The memory hosts 106 represent one or more computing devices that provide remotely accessible memory for local hosts 103 or other computing devices. By utilizing a memory host 106 to provide memory resources to local hosts 103, the memory available to individual local hosts 103 is physically or logically disaggregated from the local hosts 103. Accordingly, the collection of memory hosts 106 may be referred to as a clustered memory, pooled memory, disaggregated memory, hosted memory, remote memory, etc. Each memory host 106 can include cluster memory 116 and one or more disks 119.

The cluster memory 116 can represent the portion of memory of a memory host 106 that can be used for memory storage by a local host 103. To facilitate multiple local hosts 103 using the cluster memory 116, the cluster memory 116 can be divided into chunks 123 of cluster memory 116, with individual chunks 123 of the cluster memory 116 being allocated to individual local hosts 103. For example, the cluster memory 116 of a memory host 106 could be divided into one gigabyte chunks 123 comprising 262,144 pages that are four kilobytes each in size, and individual one gigabyte chunks 123 could be allocated to respective local hosts 103.

In some implementations, individual chunks 123 of the cluster memory 116 can be implemented as byte-addressable cluster memory 116 for the respective local host 103. In byte-addressable cluster memory 116, a computing device can directly read data from or write data to individual memory addresses of the cluster memory 116 of a memory host 106.

In other implementations, individual chunks 123 of the cluster memory 116 can be implemented as paged cluster memory 116 for the respective local host 103. In these implementations, the virtual memory manager of the operating system 129 manages access to the cluster memory 116 of a memory host 106 using paging. Individual pages can be transferred between the local memory 126 of the local host 103 and the cluster memory 116 as needed. Likewise, individual pages can also be read from the cluster memory 116 of the memory hosts 106 in some instances.

The disks 119 can represent persistent or non-volatile storage, such as solid state drives (SSDs) and hard disk drives (HDDs). A discussed later, a memory host 106 may use disks 119 to provide additional memory storage to local hosts 103 for infrequently accessed pages of memory.

The local hosts 103 can represent any computing device utilizing the cluster memory 116 provided by the memory hosts 106. Accordingly, the local host 103 can have a local memory 126 divided or organized into one or more local pages. The local host 103 can also have an operating system 129 and a local chunk map 133.

The operating system 129 can include any system software that manages the operation of computer hardware and software resources of the local host 103. The operating system 129 can also provide various services or functions to computer programs, such as processes, that are executed by the local host 103. For example, the operating system 129 may schedule the operation of tasks or processes by the processor of the local host 103. The operating system 129 may also provide virtual memory management functions to allow each process executing on the local host 103 to have its own logical or virtual address space, which the operating system 129 can map to physical addresses in the local memory 126 and/or cluster memory 116. When referring to the operating system 129, the operating system 129 can include both hypervisors and/or any other system software that manages computer hardware and software resources. Likewise, the term process can include virtual machines as well as any other executing or executable computer program.

The local chunk map 133 can represent a data structure maintained by the local host 103 to track which chunks 123 of cluster memory 116 on respective memory hosts 106 are allocated to or currently used by the local host 103. The local chunk map 133 can also indicate the offset within a chunk 123 that a particular page is located. Accordingly, when a process attempts to access a page stored in a chunk 123 in cluster memory 116, the operating system can refer to the local chunk map 133 to identify the specific memory host 106 and chunk 123 where the page is stored in cluster memory 116 as well as the address offset that specifies the location within the chunk 123 that the page is located.

The management host 109 can be employed in some configurations as a dedicated server to manage resource allocations on behalf of the memory hosts 106 and/or the local hosts 103. To perform these operations, the management host 109 can execute a management agent 136. For instance, the management agent 136 can monitor whether local host 103 or memory hosts 106 have entered a faulted state (e.g., have lost network connectivity, gone offline, powered off, etc.), and initiate appropriate remedial action. For example, the management agent 136 could send a message to one or more memory hosts 106 to notify them that chunks 123 of cluster memory 116 allocated to a faulted local host 103 can be freed or reclaimed. To accomplish this, the management agent 136 could refer to a server chunk map 139 stored on the management host 109 in order to identify which memory hosts 106 had allocated chunks 123 of cluster memory 116 to the faulted local host 103.

Next, a description of the operation of the various components of the network environment 100 is provided. Although the following descriptions illustrate how the various components of the network environment 100 can interact with each other, it is understood that other interactions are also contemplated by the various embodiments of the present disclosure.

Replication of Paged Cluster Memory

Figure 2A:
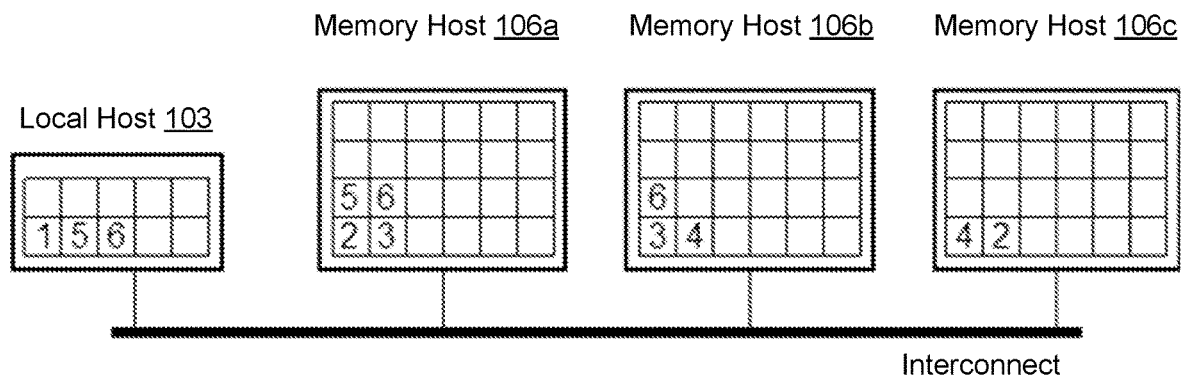
FIGS. 2A and 2B are graphical depictions of one implementation of various embodiments of the present disclosure.

FIG. 2A provides a pictorial depiction of using replication to improve resiliency of in implementations that make use of paged cluster memory 116. As illustrated, page 1 is stored in the local memory 126 of the local host 103, while pages 2, 3, and 4 are replicated and stored in the cluster memory 116 of multiple memory hosts 106a, 106b, and 106c (collectively, "memory hosts 106"). Although pages 5 and 6 are also stored in the local memory 126 of the local host 103, they are also illustrated as being in the process of being replicated and stored in the cluster memory 116 of multiple memory hosts 106.

Figure 2B:
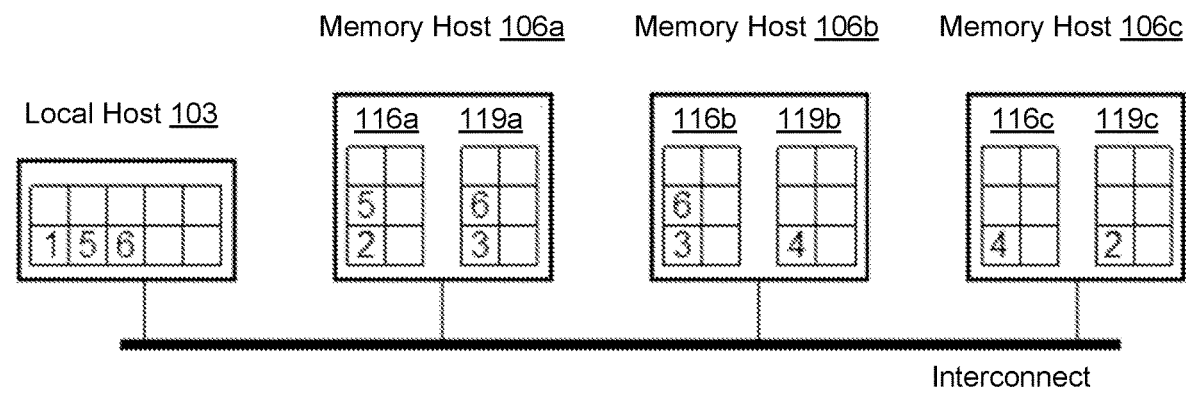

However, dynamic random access memory (DRAM) is expensive. Accordingly, FIG. 2B illustrate an alternative implementation where pages are stored using a combination of cluster memory 116 of memory hosts 106 and disks 119 of memory hosts 106. In FIG. 2B, page 1 is stored in local memory 126 of the local host 103, while pages 2, 3, 4, and 6 are replicated and stored in the cluster memory 116 of multiple memory hosts 106a, 106b, and 106c (collectively, "memory hosts 106"). Meanwhile, page 5 is in the process of being replicated and stored across multiple memory hosts 106, but is currently stored only in the cluster memory 116a of memory host 106a. As illustrated, some of the memory hosts 106 store the pages in cluster memory 116, while other memory hosts 106 store the pages on disk 119. By storing a redundant copy of a page on disk 119, redundancy can be provided using disks 119 that may offer lower storage costs compared to the DRAM used for cluster memory 116.

Figure 3:
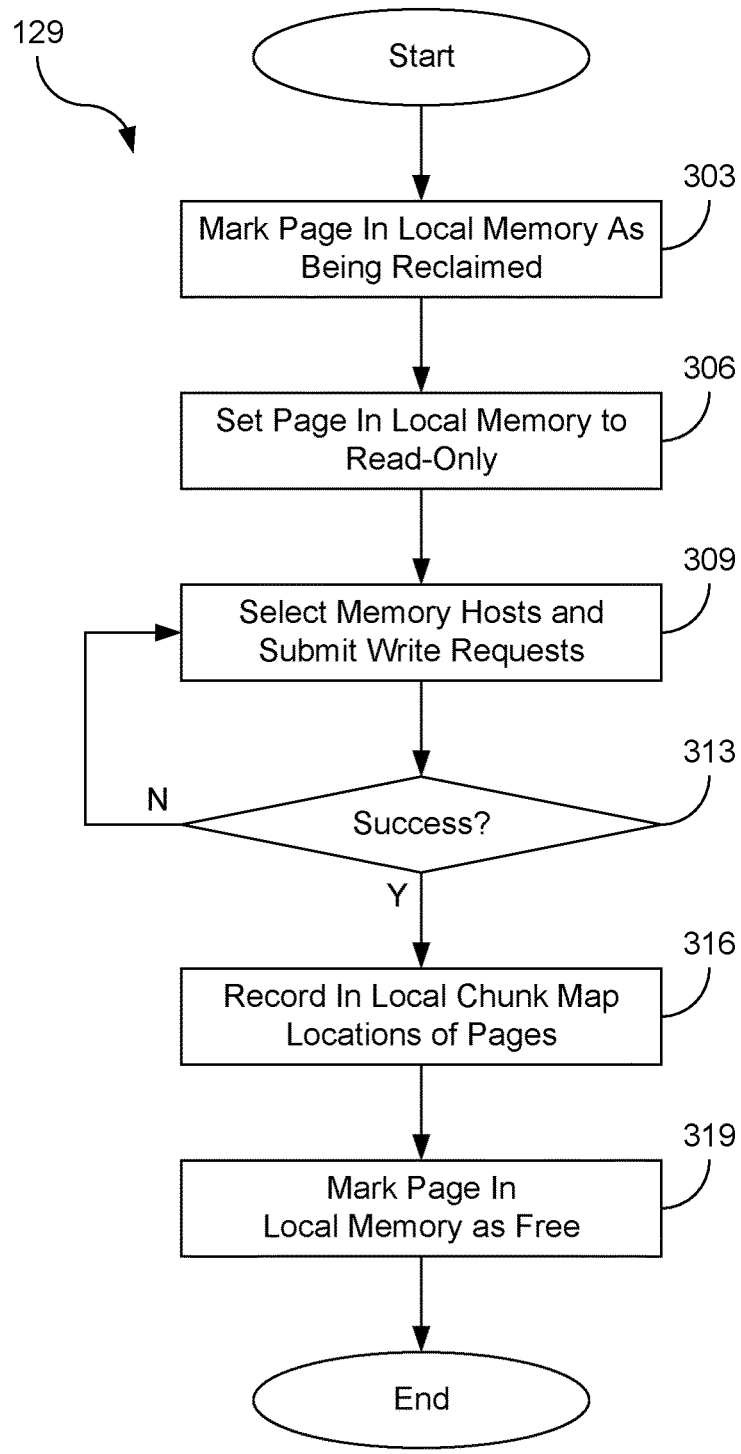
FIG. 3 is a flowchart illustrating one example of functionality implemented as portions of an application executed in the network environment of FIG. 1 according to various embodiments of the present disclosure.

Referring next to FIG. 3, shown is a flowchart that provides one example of the operation of a portion of the operating system 129 in order to reclaim pages stored in the local memory 126 and copy them to memory hosts 106 while maintaining data consistency. The flowchart of FIG. 3 provides merely an example of the many different types of functional arrangements that can be employed to implement the operation of the depicted portion of the operating system 129 of the local host 103. As an alternative, the flowchart of FIG. 3 can be viewed as depicting an example of elements of a method implemented within the network environment 100.

Beginning with block 303, the operating system 129 can mark a page in the local memory 126 as being reclaimed. This could occur, for example, when the operating system 129 determines that the page in the local memory 126 needs to be evicted and moved to the memory pool provided by the memory hosts 106. However, while the page in the local memory 126 is marked as being reclaimed, it remains allocated and therefore available to processes executing on the local host 103.

At block 306, the operating system 129 can then set the page in the local memory 126 that is being reclaimed to a read-only state. This can be done, for example, to prevent the contents of the page from being modified while it is being copied to the memory hosts 106. Setting the local page to read-only will generally be architecture dependent. Furthermore, some architectures may require flushing the translation lookaside buffers to ensure the read-only setting is visible.

Next, at block 309, the operating system 129 can then select memory hosts 106 and submit write requests to the memory hosts 106 to store a copy of the page of the local memory 126. The memory hosts 106 can be selected from those memory hosts 106 identified in a local chunk map 133 that tracks which memory hosts 106 have allocated chunks 123 of cluster memory 116 to the local host 103 and which chunks 123 of cluster memory 116 have sufficient space to store a copy of the local memory 126 page. In some implementations, the operating system 129 can further specify whether the copy of the page is to be stored in the cluster memory 116 of a memory host 106 or on a disk 119 of the memory host 106.

Moving on to block 313, the operating system 129 can wait to receive confirmations from the respective memory hosts 106 that the write requests submitted at block 309 were successful. If all of the write requests were successful, then the process can proceed to block 316. However, if one or more write requests were unsuccessful, the process could return to block 309 so that a new memory host 106 could be selected to store a copy of the local memory 126 page.

Proceeding to block 316, the operating system 129 can then record in the local chunk map 133 where the respective copies of the page were stored among the memory hosts 106. These records can include an identifier for the memory host 106, an indicator as to whether the page was stored in a chunk 123 of the cluster memory 116 or to a disk 119 of the memory host 106, an identifier of the chunk 123 used to store the page, and a memory offset indicating the location within the chunk 123 where the page is stored.

Then, at block 319, the operating system 129 can mark the page as free in the local memory 126. Some architectures may also require flushing the translation lookaside buffers to ensure the free marking of the page is visible. The page can then be reused or reallocated by the virtual memory manager of the operating system 129 when needed.

After the page is marked as read-only at block 306, it is possible that the local host 103 could attempt to write to the page in the local memory 126 before the page has been freed at block 319. Should a write attempt occur while the page is in the read-only state, a page-fault will occur and the page-fault handler of the virtual memory manager of the operating system 129 will wait for reclamation to complete before allowing the write to occur. Once the page is then freed at block 319, the page-fault handler can read the page from one of the memory hosts 106 back into the local memory 126. Alternatively, as an optimization, the page-fault handler can reuse the page that has been freed from the local memory in order to save bandwidth by avoiding a read of the page from the memory host 106, provided the page in the local memory 126 has not been allocated for another purpose. Another optimization which can be used in addition to the previous optimization is for the page-fault handler to abort the reclamation process of FIG. 3 to save bandwidth.

Figure 4:
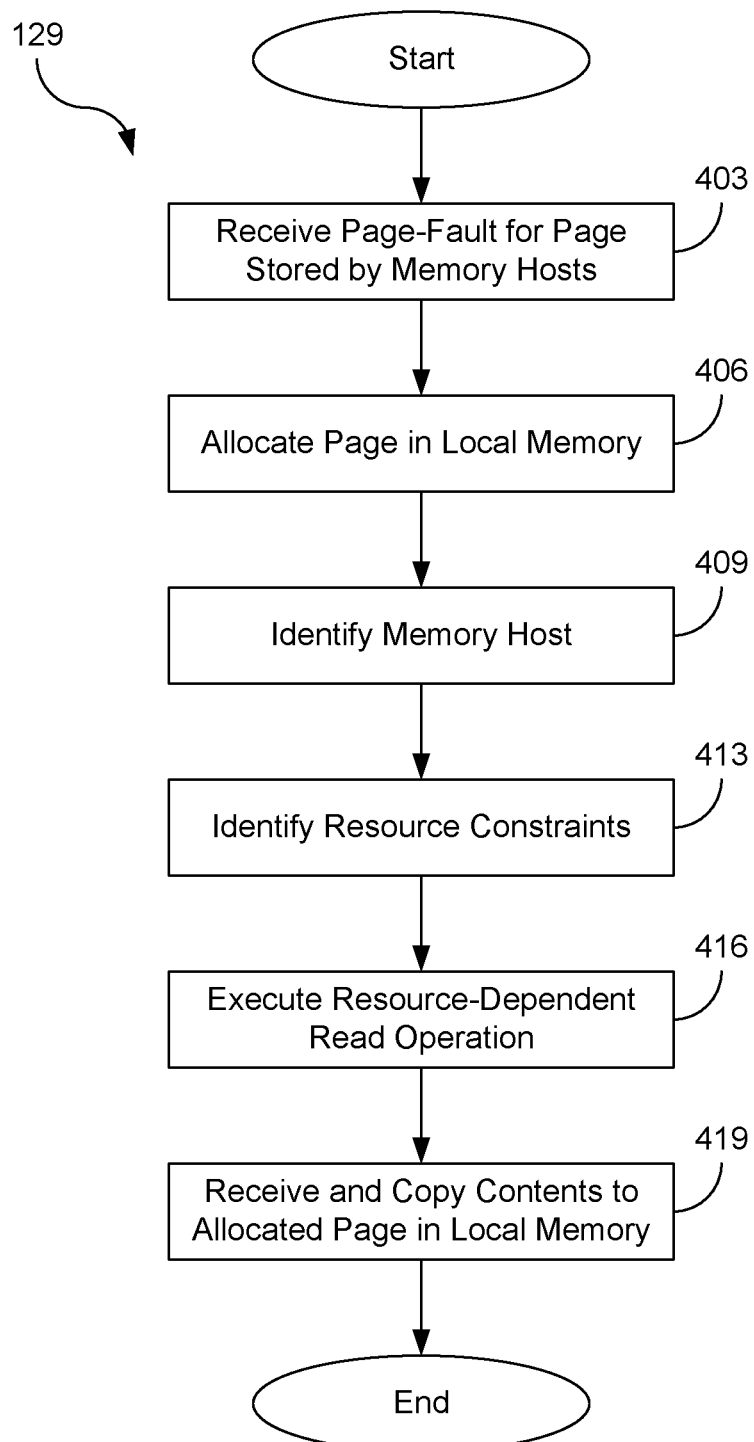
FIG. 4 is a flowchart illustrating one example of functionality implemented as portions of an application executed in the network environment of FIG. 1 according to various embodiments of the present disclosure.

Referring next to FIG. 4, shown is a flowchart that provides one example of the operation of a portion of the operating system 129 in order to read pages stored by one or more memory hosts 106. The flowchart of FIG. 4 provides merely an example of the many different types of functional arrangements that can be employed to implement the operation of the depicted portion of the operating system 129 of the local host 103. As an alternative, the flowchart of FIG. 4 can be viewed as depicting an example of elements of a method implemented within the network environment 100.

Beginning at block 403, the operating system 129 can receive a page-fault notification for a page stored by the memory hosts 106.

At block 406, the operating system 129 can allocate a page in the local memory 126 for the page stored by the memory hosts 106. For example, the operating system could allocate a free or otherwise available page in the local memory 126. As another example, the operating system could evict or otherwise reclaim a page in the local memory 126 for the page stored by the memory hosts 106. This could include reclaiming a page in the local memory 126 using the process previously described by FIG. 3.

Then, at block 409, the operating system 129 can identify a memory host 106 that is storing the page. For example, the operating system 129 could search the local chunk map 133 to identify the memory host 106 and chunk 123 in which the page is stored, as well as the offset within the chunk 123 where the page is located.

Next, at block 413, the operating system 129 can identify any resource constraints associated with the page stored by the memory host 106. For example, the operating system 129 could evaluate the degree to which a network interface of the local host 103 is utilized to determine whether a network connection to the memory host 106 has sufficient available bandwidth. As another example, the operating system 129 could evaluate the local chunk map 133 to determine the amount of cluster memory 116 allocated by one or more memory hosts 106 to the local host 103 is currently being consumed. If the operating system 129 determines that a large percentage of the pages stored in the chunk(s) 123 of cluster memory 116 are currently allocated, then the operating system 129 could determine that the cluster memory 116 of the memory host 106 is likely to be resource constrained. For instance, if the percentage of pages in the chunk 123 that are allocated exceeds a predefined threshold, then the operating system 129 could determine that the cluster memory 116 of the memory host 106 is likely to be resource constrained Proceeding to block 416, the operating system 129 can execute a resource-dependent read operation to retrieve the page stored by the memory host 106 based at least in part on the resource constraints identified at block 413.

For example, if cluster memory 116 were a constrained resource, but the bandwidth of the connection to the memory host 106 were not constrained, then the operating system 129 could read or copy the page from a first memory host 106 and send a message to all memory hosts 106 that the page could be freed from cluster memory 116. This would free the cluster memory 116 in all memory hosts 106 at the expense of subsequent bandwidth to rewrite the page to cluster memory 116 at a later time.

As another example, if the cluster memory 116 were unconstrained, but the bandwidth of the connection to the memory host(s) 106 were a constrained resource, then the operating system 129 could read of copy the page from one of the memory hosts 106. The operating system 129 could further either explicitly send a message to the memory hosts 106 not to free the page from cluster memory 116 or refrain from sending a message to the memory hosts 106 instructing the memory hosts 106 to free the page from cluster memory 116. Assuming that the page is not subsequently written to while stored in local memory 126, the local host 103 could avoid consuming the bandwidth necessary to copy the page from local memory 126 back to cluster memory 116 because a copy of the page remains in the cluster memory 116 of the memory hosts 106. Similarly, if the operating system 129 determines that the likelihood or probability that the page copied back to local memory 126 were to be written to or otherwise modified were less than a predefined threshold, then the operating system 129 could further either explicitly send a message to the memory hosts 106 not to free the page from cluster memory 116 or refrain from sending a message to the memory hosts 106 instructing the memory hosts 106 to free the page from cluster memory 116 in order to attempt to conserve bandwidth between the memory hosts 106 and the local host 103. The probability that the page would be written to or modified could be calculated based on evaluation of spatial locality or temporal locality of current and/or previous writes to pages in the local memory 126.

In some instances, however the operating system 129 could determine that both cluster memory 116 and the bandwidth of the connection between the local host 103 and the memory hosts 106 are resource constrained. This could occur, for example, when memory hosts 106 are being heavily utilized by multiple local hosts 103 during the same time period. In response, the operating system 129 could take a hybrid approach, whereby it instructs some, but not all, of the memory hosts 106 to free the page from cluster memory 116. As a result, the amount of cluster memory 116 available to the memory hosts 106 is increased and the amount of bandwidth needed to copy the page from the local memory 126 back to the memory hosts 106 is reduced.

At block 419, the operating system can receive the contents of the page stored by the memory host 106 and copy the contents to the page in the local memory 126. The operating system 129 can then update the page table to reflect the allocation of the page in the local memory 126.

Erasure Coding for Paged Cluster Memory

As an alternative to storing pages redundantly on separate memory hosts 106, some implementations of the present disclosure could store pages on separate memory hosts 106 using various erasure coding techniques. Compared to replication, erasure coding techniques can consume less storage space in cluster memory 116 or on disks 119. However, there is additional overhead involved in reading data from or writing data to memory hosts 106 when using erasure coding techniques.

In general, erasure coding techniques are techniques whereby k pieces of data can be encoded into n pieces of data, where n>k, such that any k of the n pieces of data can be used to reconstruct the data. One well-known example of an erasure coding technique is RAID-5 disk storage, whereby any 2 of 3 pieces can be read in order to reconstruct the data stored to the RAID array. In the various embodiments of the present disclosure, two types of erasure coding techniques can be used—internal erasure coding techniques and external erasure coding techniques.

Figure 5A:
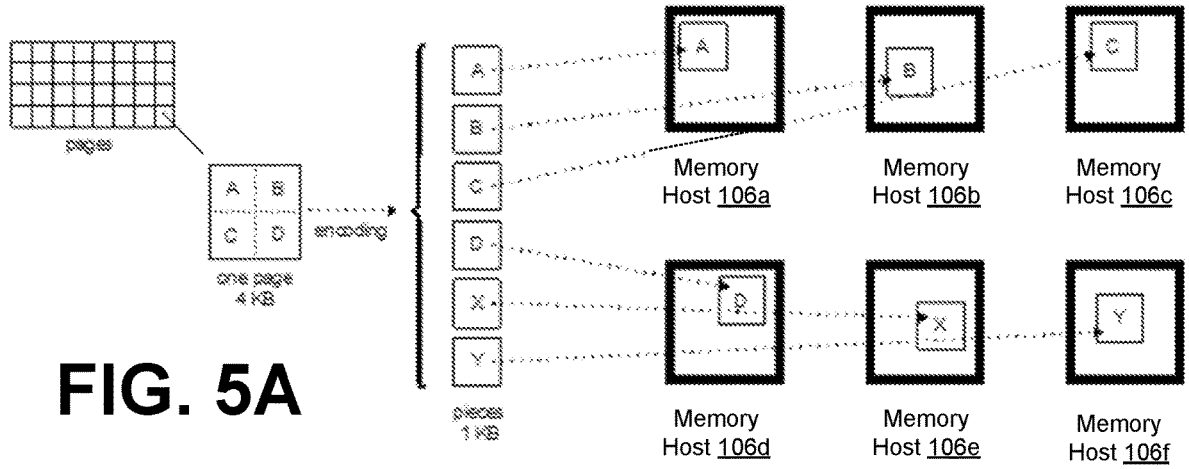
FIGS. 5A-5F are graphical depictions of one implementation of various embodiments of the present disclosure.
Figure 5B:
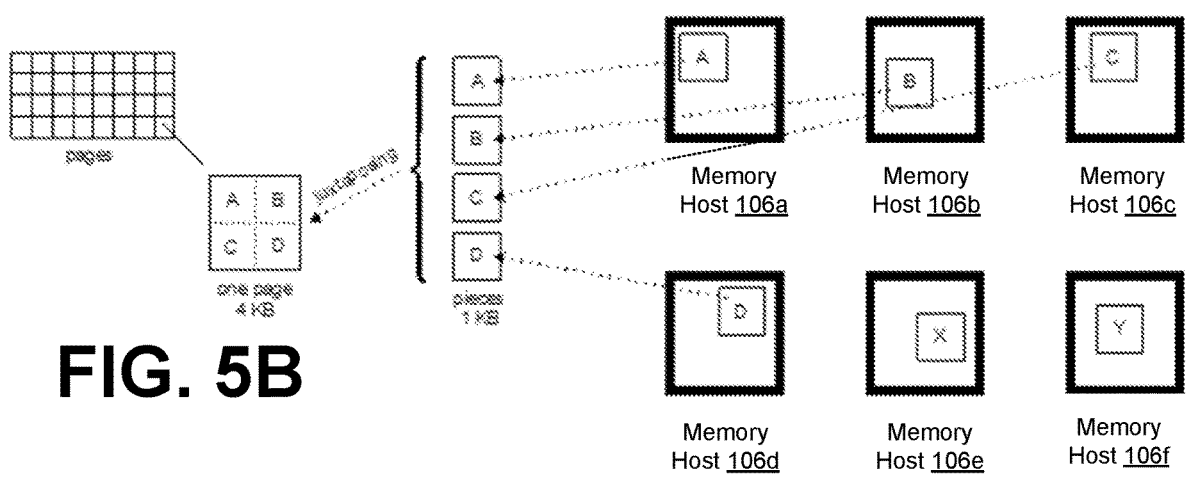
Figure 5C:
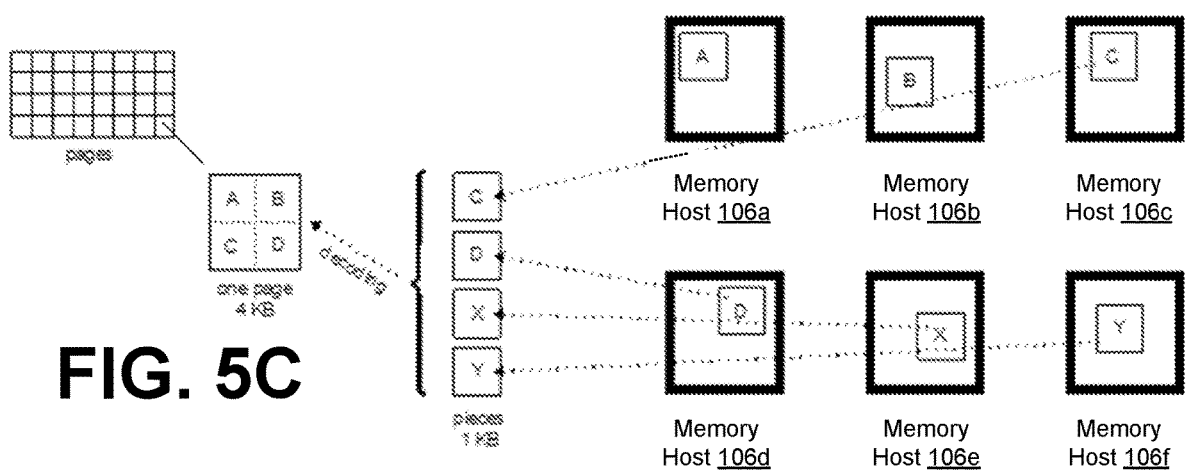

Internal erasure coding involves any erasure coding technique where the parity data is generated based on data internal to the page. For example, an internal erasure code could split a four-kilobyte page into four one-kilobyte subpages A, B, C, and D, which could be used to generate two one-kilobyte parity subpages X and Y. The subpages A, B, C, and D, as well as the parity subpages X and Y, could then be stored across multiple memory hosts 106. Should any two memory hosts 106 in this example fail or fault, the page can still be reconstructed from the remaining subpages and/or parity subpages. However, in order to read the page, at least 4 of the subpages A, B, C, D, X, and Y, have to be read from four separate memory hosts 106 in order to reconstruct the page. An example of internal erasure coding is illustrated in FIGS. 5A-5C, with FIG. 5A providing a graphical illustration of an encoding procedure for internal coding, FIG. 5B illustrating a decoding procedure to retrieve pages when the subpages are available, and FIG. 5C illustrating a decoding procedure used when one of the original subpages is no longer available and a parity subpage is used.

Figure 5D:
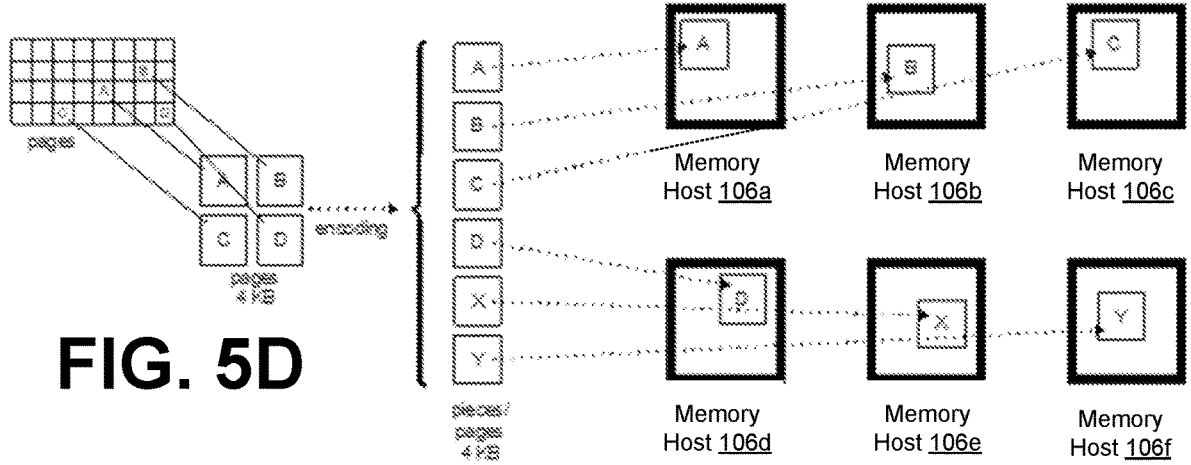
Figure 5E:
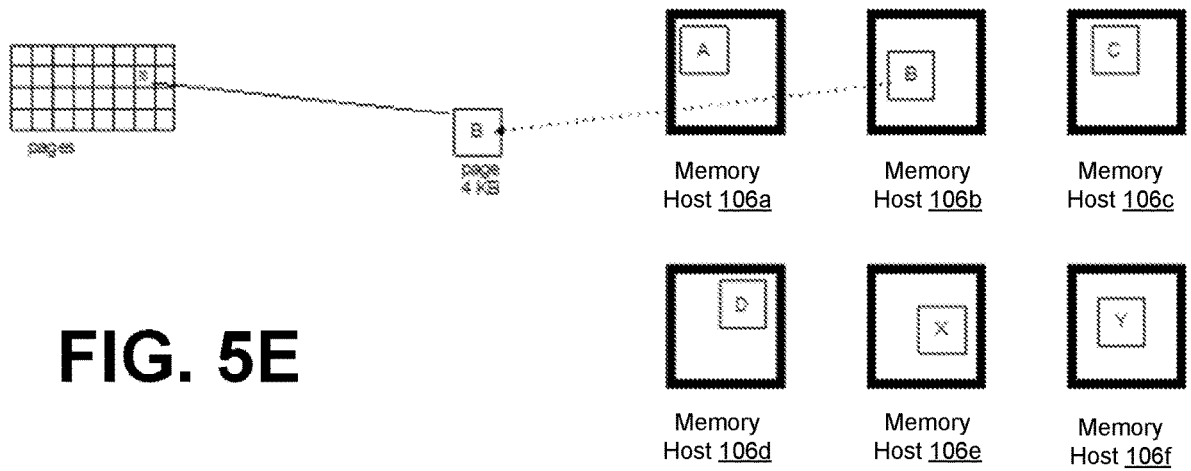
Figure 5F:
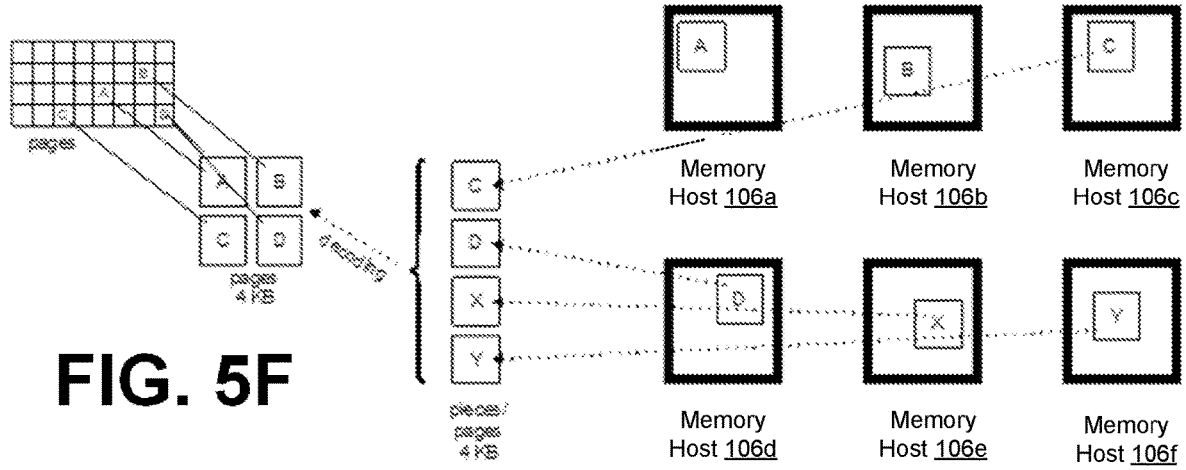

External erasure coding involves any erasure coding technique where the parity data is based on a combination of multiple pages of memory. For example, an external coding technique could combine pages A, B, C, and D in order to generate parity pages X and Y. Pages A, B, C, and D, as well as parity pages X and Y, could then be stored across multiple memory hosts 106. Pages A, B, C, and D can be read individually from memory hosts 106 as needed. However, any changes to any one or more of pages A, B, C, or D requires reconstructing parity pages X and Y and potentially reading the remaining ones of pages A, B, C, or D from the memory hosts 106. This amplifies the amount of data being written to the memory hosts 106 when a page is updated, compared to the amount of date written to the memory hosts 106 when internal erasure coding techniques are used. An example of external erasure coding is illustrated in FIGS. 5D-5F, with FIG. 5D providing a graphical illustration of an encoding procedure for external coding, FIG. 5E illustrating a decoding procedure to retrieve a page when the page is available, and FIG. 5F illustrating a decoding procedure used when one of the original pages is no longer available and a parity page is used.

Figure 6A:
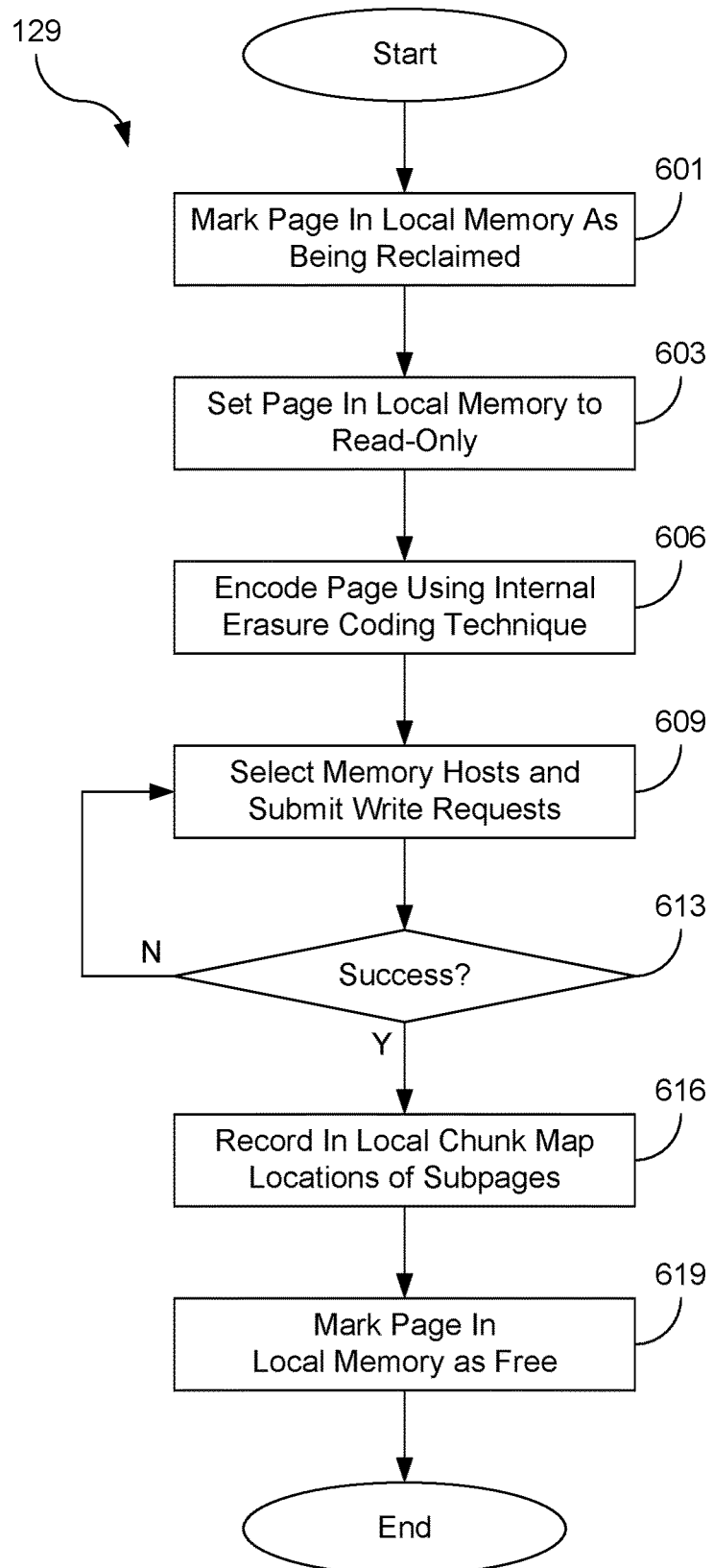
FIGS. 6A and 6B are flowcharts illustrating one example of functionality implemented as portions of an application executed in the network environment of FIG. 1 according to various embodiments of the present disclosure.

Referring next to FIG. 6A, shown is a flowchart that provides one example of the operation of a portion of the operating system 129 in order to reclaim pages stored in the local memory 126 and copy them to memory hosts 106 using internal erasure coding techniques. The flowchart of FIG. 6A provides merely an example of the many different types of functional arrangements that can be employed to implement the operation of the depicted portion of the operating system 129 of the local host 103. As an alternative, the flowchart of FIG. 6A can be viewed as depicting an example of elements of a method implemented within the network environment 100.

Beginning with block 601, the operating system 129 can mark a page in the local memory 126 as being reclaimed. This could occur, for example, when the operating system 129 determines that the page in the local memory 126 needs to be evicted and moved to the memory pool provided by the memory hosts 106. However, while the page in the local memory 126 is marked as being reclaimed, it remains allocated and therefore available to processes executing on the local host 103.

At block 603, the operating system 129 can then set the page in the local memory 126 that is being reclaimed to a read-only state. This can be done, for example, to prevent the contents of the page from being modified while it is being copied to the memory hosts 106. Setting the local page to read-only will generally be architecture dependent. Furthermore, some architectures may require flushing the translation lookaside buffer to ensure the read-only setting is visible.

Then, at block 606, the operating system 129 can encode the page using an internal erasure coding technique. For example, the operating system 129 could split page into multiple sub-pages. The operating system 129 could then generate or create one or more parity sub-pages based at least in part on the multiple sub-pages.

Next, at block 609, the operating system 129 can then select memory hosts 106 and submit write requests to the memory hosts 106 to store copies of the subpages and parity sub-pages. The memory hosts 106 can be selected from those memory hosts 106 identified in a local chunk map 133 that tracks which memory hosts 106 have allocated chunks 123 of cluster memory 116 to the local host 103 and which chunks 123 of cluster memory 116 have sufficient space to store a copy of the page of the local memory 126. In some implementations, the operating system 129 can further specify whether a subpage or parity subpage is to be stored in the cluster memory 116 of a memory host 106 or on a disk 119 of the memory host 106.

Moving on to block 613, the operating system 129 can wait to receive confirmations from the respective memory hosts 106 that the write requests submitted at block 609 were successful. If all of the write requests were successful, then the process can proceed to block 616. However, if one or more write requests were unsuccessful, the process could return to block 609 so that a new memory host 106 could be selected to store a copy of the respective subpage or parity subpage.

Proceeding to block 616, the operating system 129 can then record in the local chunk map 133 where the respective subpages or parity subpages were stored among the memory hosts 106. The operating system 129 can also record in the local chunk map 133 which subpages and parity subpages correspond to each page stored by the memory hosts 106. Accordingly, the records in the local chunk map 133 can include an identifier for the memory host 106, an indicator as to whether the subpage or parity subpage was stored in a chunk 123 of the cluster memory 116 or to a disk 119 of the memory host 106, an identifier of the chunk 123 used to store the page, a memory offset indicating the location within the chunk 123 where the page is stored, and a unique page identifier for the record for each subpage or parity subpage.

Then, at block 619, the operating system 129 can mark the page as free in the local memory 126. Some architectures may also require flushing the translation lookaside buffer to ensure the free marking is visible. The page can then be reused or reallocated by the virtual memory manager of the operating system 129 when needed.

After the page is marked as read-only at block 603, it is possible that the local host 103 could attempt to write to the page in the local memory 126 before the page has been freed at block 619. Should a write attempt occur while the page is in the read-only state, a page-fault will occur and the page-fault handler of the virtual memory manager of the operating system 129 will wait for reclamation to complete before allowing the write to occur. Once the page is then freed at block 619, the page-fault handler can read the page from one of the memory hosts 106 back into the local memory 126. Alternatively, as an optimization, the page-fault handler can reuse the page that has been freed from the local memory in order to save bandwidth by avoiding a read of the page from the memory host 106, provided the page in the local memory 126 has not been allocated for another purpose. Another optimization which can be used in addition to the previous optimization is for the page-fault handler to abort the reclamation process of FIG. 6A to save bandwidth.

Figure 6B:
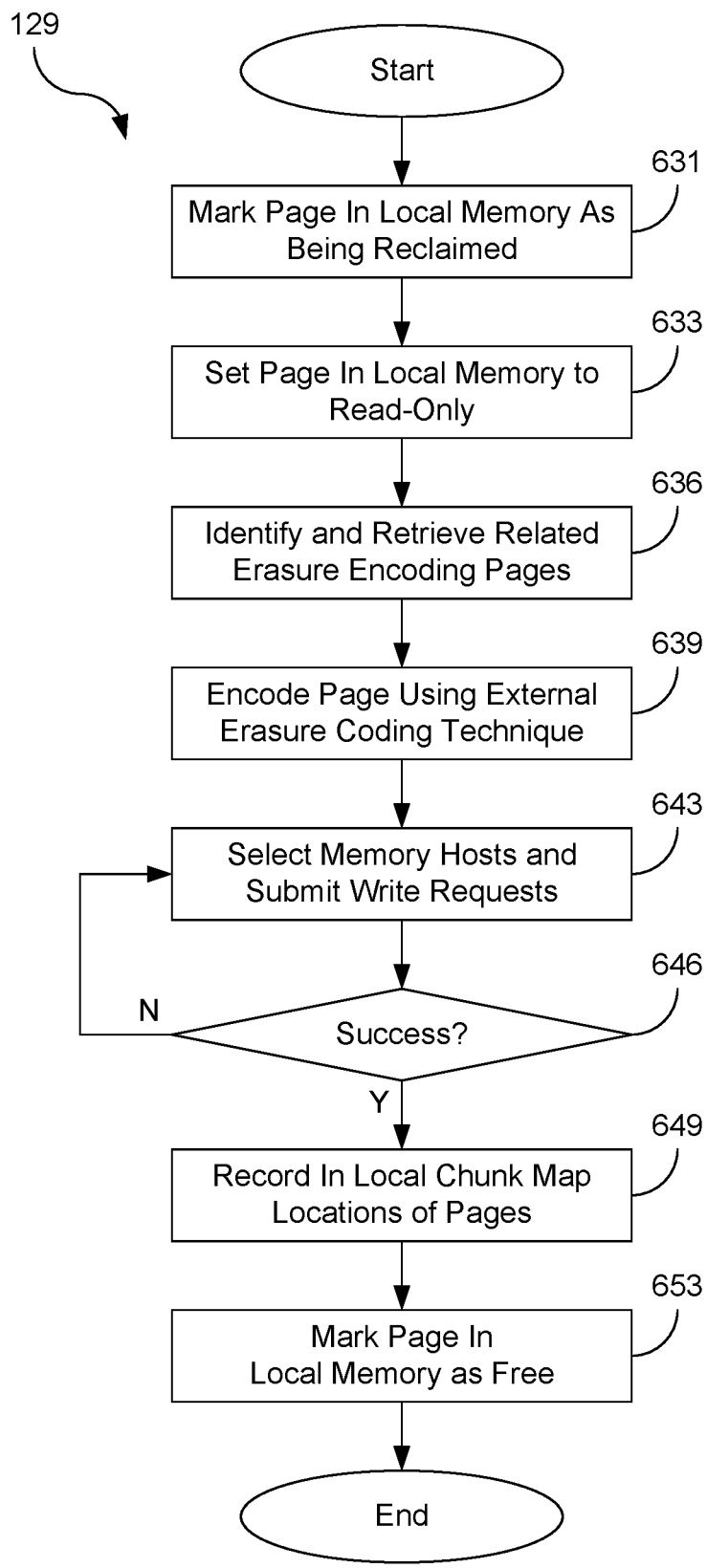

Referring next to FIG. 6B, shown is a flowchart that provides one example of the operation of a portion of the operating system 129 in order to reclaim pages stored in the local memory 126 and copy them to memory hosts 106 using external erasure coding techniques. The flowchart of FIG. 6B provides merely an example of the many different types of functional arrangements that can be employed to implement the operation of the depicted portion of the operating system 129 of the local host 103. As an alternative, the flowchart of FIG. 6B can be viewed as depicting an example of elements of a method implemented within the network environment 100.

Beginning with block 631, the operating system 129 can mark a page in the local memory 126 as being reclaimed. This could occur, for example, when the operating system 129 determines that the page in the local memory 126 needs to be evicted and moved to the memory pool provided by the memory hosts 106. However, while the page in the local memory 126 is marked as being reclaimed, it remains allocated and therefore available to processes executing on the local host 103.

At block 633, the operating system 129 can then set the page in the local memory 126 that is being reclaimed to a read-only state. This can be done, for example, to prevent the contents of the page from being modified while it is being copied to the memory hosts 106. Setting the local page to read-only will generally be architecture dependent. Furthermore, some architectures may require flushing the translation lookaside buffer to ensure the read-only setting is visible.

Proceeding to block 636, the operating system 129 can then identify any additional pages related to the page in the local memory 126 that is being reclaimed. For example, if the page in the local memory 126 had been previously stored in a cluster memory 116 of a memory host 106, the operating system 129 could reference a local chunk map 133 to identify related pages or parity pages that were encoded together using an external erasure coding technique. As another example, if the page in the local memory 126 is not related to or associated with any other pages or parity pages for erasure encoding purposes, then the operating system 129 could select additional pages that were similarly unrelated or unassociated with other pages or parity pages for erasure encoding purposes. This could occur, for example, if the page had not been previously stored in the cluster memory 116 of a memory host 106, and therefore had not been subject to an erasure coding technique. In such a situation, the operating system 129 could identify other pages in the local memory 126 that were being evicted to the memory hosts 106 for the first time to use for a subsequent erasure encoding.

Then, at block 639, the operating system 129 can encode the page using an external erasure coding technique. For example, the operating system 129 could generate one or more parity pages based at least in part on the page being reclaimed from the local memory 126 and the additional pages identified at block 636.

Next, at block 643, the operating system 129 can then select memory hosts 106 and submit write requests to the memory hosts 106 to store copies of the pages and parity pages encoded together at block 639. The memory hosts 106 can be selected from those memory hosts 106 identified in a local chunk map 133 that tracks which memory hosts 106 have allocated chunks 123 of cluster memory 116 to the local host 103 and which chunks 123 of cluster memory 116 have sufficient space to store a copy of the page of the local memory 126. In some implementations, the operating system 129 can further specify whether a page or parity page is to be stored in the cluster memory 116 of a memory host 106 or on a disk 119 of the memory host 106. In addition, the operating system 129 could, in some instances, select memory hosts 106 that had previously stored a copy of one of the pages or parity pages. This could be done, for example in order to overwrite a previous version of one of the pages. Alternatively, the operating system 129 could submit write requests to selected memory hosts 106 and also submit requests to one or more memory hosts 106 to free previously stored versions of the pages and parity pages.

Moving on to block 646, the operating system 129 can wait to receive confirmations from the respective memory hosts 106 that the write requests submitted at block 643 were successful. If all of the write requests were successful, then the process can proceed to block 649. However, if one or more write requests were unsuccessful, the process could return to block 643 so that a new memory host 106 could be selected to store a copy of the respective page or parity page.

Proceeding to block 649, the operating system 129 can then record in the local chunk map 133 where the respective pages or parity pages were stored among the memory hosts 106. The operating system 129 can also record in the local chunk map 133 which pages and parity pages stored by the memory hosts 106 are related to each other. Accordingly, the records in the local chunk map 133 can include an identifier for the memory host 106, an indicator as to whether the page or parity page was stored in a chunk 123 of the cluster memory 116 or to a disk 119 of the memory host 106, an identifier of the chunk 123 used to store the page, a memory offset indicating the location within the chunk 123 where the page is stored, and a unique identifier that identifies a group of related pages and parity pages.

Then, at block 653, the operating system 129 can mark the page as free in the local memory 126. Some architectures may also require flushing the translation lookaside buffer to ensure the free marking is visible. The page can then be reused or reallocated by the virtual memory manager of the operating system 129 when needed.

After the page is marked as read-only at block 633, it is possible that the local host 103 could attempt to write to the page in the local memory 126 before the page has been freed at block 653. Should a write attempt occur while the page is in the read-only state, a page-fault will occur and the page-fault handler of the virtual memory manager of the operating system 129 will wait for reclamation to complete before allowing the write to occur. Once the page is then freed at block 653, the page-fault handler can read the page from one of the memory hosts 106 back into the local memory 126. Alternatively, as an optimization, the page-fault handler can reuse the page that has been freed from the local memory in order to save bandwidth by avoiding a read of the page from the memory host 106, provided the page in the local memory 126 has not been allocated for another purpose. Another optimization which can be used in addition to the previous optimization is for the page-fault handler to abort the reclamation process of FIG. 6B to save bandwidth.

Figure 7:
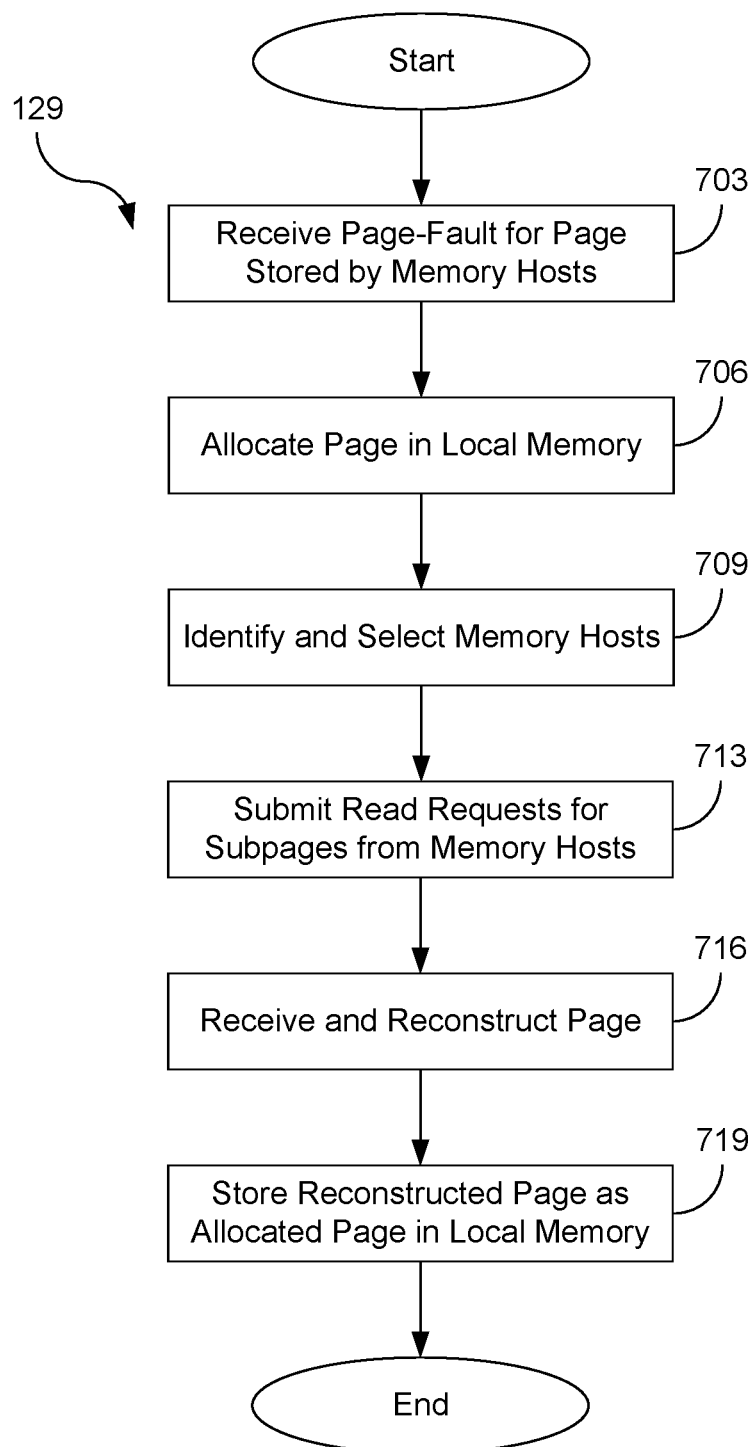
FIG. 7 is a flowchart illustrating one example of functionality implemented as portions of an application executed in the network environment of FIG. 1 according to various embodiments of the present disclosure.

Referring next to FIG. 7, shown is a flowchart that provides one example of the operation of a portion of the operating system 129 in order to read subpages or parity subpages stored by one or more memory hosts 106 and reconstruct the respective page. The flowchart of FIG. 7 provides merely an example of the many different types of functional arrangements that can be employed to implement the operation of the depicted portion of the operating system 129 of the local host 103. As an alternative, the flowchart of FIG. 7 can be viewed as depicting an example of elements of a method implemented within the network environment 100.

Beginning at block 703, the operating system 129 can receive a page-fault notification for a page stored by the memory hosts 106.

At block 706, the operating system 129 can allocate a page in the local memory 126 for the page stored by the memory hosts 106. For example, the operating system could allocate a free or otherwise available page in the local memory 126. As another example, the operating system could evict or otherwise reclaim a page in the local memory 126 for the page stored by the memory hosts 106. This could include reclaiming a page in the local memory 126 using the process previously described by FIG. 6.

Then, at block 709, the operating system 129 can identify the memory hosts 106 that store the subpages or parity subpages associated with the page request at block 703. For example, the operating system 129 could evaluate the local chunk map 133 using a unique page identifier for the requested page to search for the memory hosts 106, chunks 123, and offsets within the chunks 123 of the individual subpages or parity subpages associated with the unique page identifier. Once the operating system 129 has identified the memory hosts 106, the operating system 129 can identify a subset of the memory hosts 106 from which to request an appropriate number of subpages and parity subpages to reassemble or recreate the requested page. In implementations where one or more of the subpages or parity subpages are stored on disks 119 instead of cluster memory 116, the operating system 129 could preferentially select memory hosts 106 that are storing a subpage or parity subpage within its cluster memory 116.

Next, at block 713, the operating system 129 can submit read requests to the memory hosts 106 selected at block 709. Each read request can include the identifier for the chunk 123 of cluster memory 116 or an identifier of the disk 119, as well as an offset identifying the location of the subpage or parity subpage within the chunk 123 or disk 119.

Proceeding to block 716, the operating system 129 can receive the requested subpages or parity subpages. Once received, the operating system 129 can use the internal erasure coding technique to recreate the contents of the requested page from the received subpages and parity subpages.

Then, at block 719, the operating system can copy or otherwise store the contents of the recreated page to the allocated page in the local memory 126. The operating system 129 can then update the page table to reflect the allocation of the page in the local memory 126.

Replication of Byte-Addressable Cluster Memory

As previously discussed, byte-addressable implementations of cluster memory 116 allow for a processor of a local host 103 to read or write data directly in the cluster memory 116 without any software intervention. For example, the cluster memory 116 may be presented to the operating system 129 as part of the physical address space available to the local host 103. Accordingly, the processor of the local host 103 can read from or write directly to the cluster memory 116 as it would any other memory address for the local memory 126. However, without replication or erasure coding techniques, data stored in the byte-addressable cluster memory 116 will be lost if the memory host 106 is unresponsive due to a fault (e.g., a crash of the memory host 106, a loss of power or network connection by the memory host 106, etc.).

One solution is to replicate or duplicate writes to the byte-addressable cluster memory 116. For example, the pages in the byte-addressable cluster memory 116 could be set to read-only or write-protected status. As a result, the local host 103 can read from the pages in the byte-addressable cluster memory 116, but the local host 103 would cause a page-fault to occur if it tried to write to the page. The page-fault handler of the operating system 129 of the local host 103 could then copy or load the page from the byte-addressable cluster memory 116 to the local memory 126, which is writeable. When the local host 103 later reclaims the page from the local memory 126, the virtual memory manager of the operating system 129 can write multiple copies of the page to multiple memory hosts 106.

Figure 8:
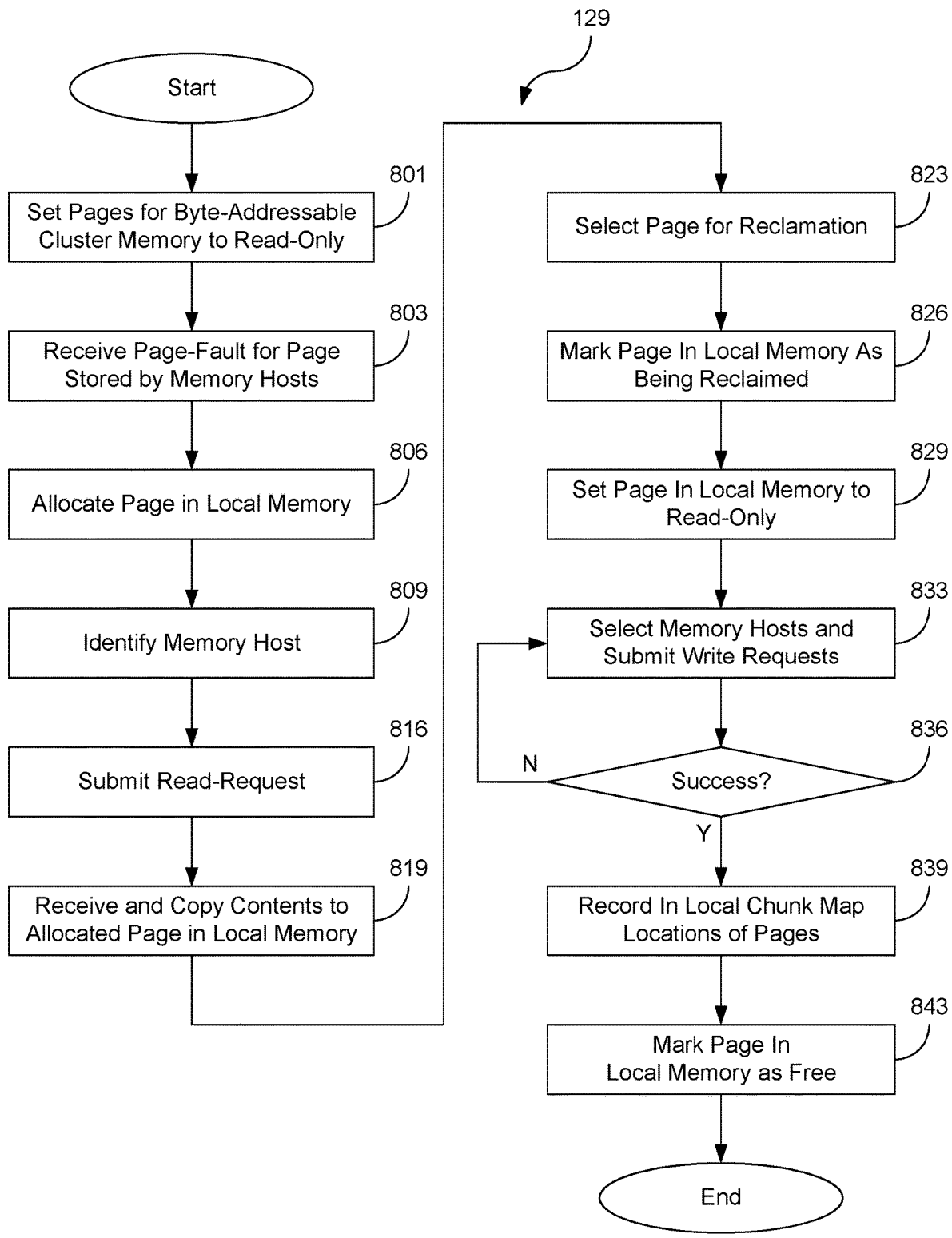
FIG. 8 is a flowchart illustrating one example of functionality implemented as portions of an application executed in the network environment of FIG. 1 according to various embodiments of the present disclosure.

Referring next to FIG. 8, shown is a flowchart that provides one example of the operation of a portion of the operating system 129 in order to reclaim pages stored in the local memory 126 and copy them to memory hosts 106 that provide byte-addressable cluster memory 116. The flowchart of FIG. 8 provides merely an example of the many different types of functional arrangements that can be employed to implement the operation of the depicted portion of the operating system 129 of the local host 103. As an alternative, the flowchart of FIG. 8 can be viewed as depicting an example of elements of a method implemented within the network environment 100.

Beginning at block 801, the operating system 129 can set one or more pages of byte addressable cluster memory 116 to read-only or write-protected status. This can prevent the local host 103 from writing to the byte addressable pages in the cluster memory 116 of the memory hosts. Should the local host 103 attempt to write to a page of memory stored in the byte addressable cluster memory 116, then a page-fault will occur.

Then, at block 803, the operating system 129 can receive a page-fault for a page stored in the byte addressable cluster memory 116 of the memory hosts 106. For example, a process executing on the local host 103 could have attempted to save data to or update the page stored in the byte addressable cluster memory 116.

Next, at block 806, the operating system 129 can allocate a page in the local memory 126 for the page stored in the byte-addressable cluster memory of the memory host 106. For example, the operating system 129 could allocate a free or otherwise available page in the local memory 126. As another example, the operating system could evict or otherwise reclaim a page in the local memory 126 for the page stored by the memory hosts 106.

Then, at block 809, the operating system 129 can identify the memory host 106 that is storing the page that includes the byte-addressable cluster memory 116 address that was the source of the page-fault. For example, the operating system 129 could search the local chunk map 133 to identify the memory host 106 and chunk 123 of memory allocated to the local host 103. The operating system 129 could then send a request to the memory host 106 for the page within the chunk 123 of the cluster memory 116 containing the memory address.

Proceeding to block 816, the operating system 129 can submit a read request to the memory host 106 to retrieve the page stored by the memory host 106. Assuming that the read request is successful, the process can proceed to block 819. However, it is possible that the operating system 129 could receive an exception in response to the read request submitted at block 816, such as a machine-check exception or page-fault exception. If an exception is received, this could indicate that the memory host 106 is in a faulted state (e.g., the memory host 106 no longer has a copy of the page, or the memory host 106 is unreachable). In response to an exception, operating system 129 could repeat blocks 809 and 816 to identify another memory host 106 containing a copy of the page that includes the byte-addressable cluster memory 116 address that was the source of the page-fault received at block 803 and submit a read-request to the subsequent memory host 106.

Then, at block 819, the operating system 129 can receive the contents of the page stored by the memory host 106 and copy the contents to the page in the local memory 126. The operating system 129 can then update the page table to reflect the allocation of the page in the local memory 126. As a result, the process that first attempted to write to the read-only address in the byte-addressable cluster-memory 116 can now write to the local memory 126 location.

Moving on to block 823, the operating system 129 can select the page copied from the byte-addressable cluster memory 116 to the local memory 126 for reclamation. This could occur in response to a need for additional memory for another process. The operating system 129 could use various benchmarks, such as how frequently the page is read from or written to, how long it has been since the page was last read from or written to, in order to determine whether to select the page for reclamation.

Next at block 826, the operating system 129 can mark the page in the local memory 126 as being reclaimed. However, while the page in the local memory 126 is marked as being reclaimed, it remains allocated and therefore available to processes executing on the local host 103.

Therefore, at block 829, the operating system 129 can then set the page in the local memory 126 that is being reclaimed to a read-only state. This can be done, for example, to prevent the contents of the page from being modified while it is being copied to the memory hosts 106. Setting the local page to read-only will generally be architecture dependent. Furthermore, some architectures may require flushing the translation lookaside buffer to ensure the read-only setting is visible.

Next, at block 833, the operating system 129 can then select memory hosts 106 and submit write requests to the memory hosts 106 to store a copy of the page of the local memory 126. The memory hosts 106 can be selected from those memory hosts 106 identified in a local chunk map 133 that tracks which memory hosts 106 have allocated chunks 123 of cluster memory 116 to the local host 103 and which chunks 123 of cluster memory 116 have sufficient space to store a copy of the local memory 126 page. In some implementations, the operating system 129 can further specify whether the copy of the page is to be stored in the cluster memory 116 of a memory host 106 or on a disk 119 of the memory host 106.

Moving on to block 836, the operating system 129 can wait to receive confirmations from the respective memory hosts 106 that the write requests submitted at block 833 were successful. If all of the write requests were successful, then the process can proceed to block 839. However, if one or more write requests were unsuccessful, the process could return to block 833 so that a new memory host 106 could be selected to store a copy of the page of the local memory 126.

Proceeding to block 839, the operating system 129 can then record in the local chunk map 133 where the respective copies of the page were stored among the memory hosts 106. These records can include an identifier for the memory host 106, an indicator as to whether the page was stored in a chunk 123 of the cluster memory 116 or to a disk 119 of the memory host 106, an identifier of the chunk 123 used to store the page, and a memory offset indicating the location within the chunk 123 where the page is stored.

Then, at block 843, the operating system 129 can mark the page as free in the local memory 126. Some architectures may also require flushing the translation lookaside buffer to ensure the free marking is visible. The page can then be reused or reallocated by the virtual memory manager of the operating system 129 when needed.

After the page is marked as read-only at block 829, it is possible that the local host 103 could attempt to write to the page in the local memory 126 before the page has been freed at block 843. Should a write attempt occur while the page is in the read-only state, a page-fault will occur and the page-fault handler of the virtual memory manager of the operating system 129 will wait for reclamation to complete before allowing the write to occur. Once the page is then freed at block 843, the page-fault handler can read the page from byte-addressable cluster memory of one of the memory hosts 106 back into the local memory 126. Alternatively, as an optimization, the page-fault handler can reuse the page that has been freed from the local memory 126 in order to save bandwidth by avoiding a read of the page from the memory host 106, provided the page in the local memory 126 has not been allocated for another purpose. Another optimization which can be used in addition to the previous optimization is for the page-fault handler to abort the reclamation process to save bandwidth.

Erasure Coding for Byte-Addressable Cluster Memory

As previously discussed, byte-addressable implementations of cluster memory 116 allow for a processor of a local host 103 to read or write data directly in the cluster memory 116 without any software intervention. For example, the cluster memory 116 may be presented to the operating system 129 as part of the physical address space available to the local host 103. Accordingly, the processor of the local host 103 can read from or write directly to the cluster memory 116 as it would any other memory address for the local memory 126. However, without replication or erasure coding techniques, data stored in the byte-addressable cluster memory 116 will be lost if the memory host 106 is unresponsive due to a fault (e.g., a crash of the memory host 106, a loss of power or network connection by the memory host 106, etc.).

As an alternative to storing pages redundantly on separate memory hosts 106, some implementations of the present disclosure could store pages on separate memory hosts 106 using various erasure coding techniques. Compared to replication, erasure coding techniques can consume less storage space in cluster memory 116 or on disks 119. However, there is additional overhead involved in reading data from or writing data to memory hosts 106 when using erasure coding techniques.

As previously mentioned, erasure coding techniques are techniques whereby k pieces of data can be encoded into n pieces of data, where n>k, such that any k of the n pieces of data can be used to reconstruct the data. One well-known example of an erasure coding technique is RAID-5 disk storage, whereby any 2 of 3 pieces can be read in order to reconstruct the data stored to the RAID array. In the various embodiments of the present disclosure, two types of erasure coding techniques can be used—internal erasure coding techniques and external erasure coding techniques.

External erasure coding involves any erasure coding technique where the parity data is based on a combination of multiple pages of memory. For example, an external coding technique could combine pages A, B, C, and D in order to generate parity pages X and Y. Pages A, B, C, and D, as well as parity pages X and Y, could then be stored across multiple memory hosts 106. Pages A, B, C, and D can be read individually from memory hosts 106 as needed. However, any changes to any one or more of pages A, B, C, or D requires reconstructing parity pages X and Y and potentially reading the remaining ones of pages A, B, C, or D from the memory hosts 106. This amplifies the amount of data being written to the memory hosts 106 when a page is updated, compared to the amount of date written to the memory hosts 106 when internal erasure coding techniques are used. A previously discussed example of external erasure coding is illustrated in FIGS. 5D-5F, with FIG. 5D providing a graphical illustration of an encoding procedure for internal coding, FIG. 5E illustrating a decoding procedure to retrieve pages when the subpages are available, and FIG. 5F illustrating a decoding procedure used when one of the original subpages is no longer available and a parity subpage is used.

With respect to byte-addressable implementations of cluster memory 116, external erasure coding techniques can be used to provide redundancy and resiliency for pages stored on memory hosts 106. In various embodiments of the present disclosure, the virtual memory manager of the operating system 129 can be modified to store pages evicted from the local memory 126 to byte-addressable cluster memory 116 using external erasure coding techniques. This allows the pages to be read using byte addresses, while still using erasure coding for redundancy.

Figure 9:
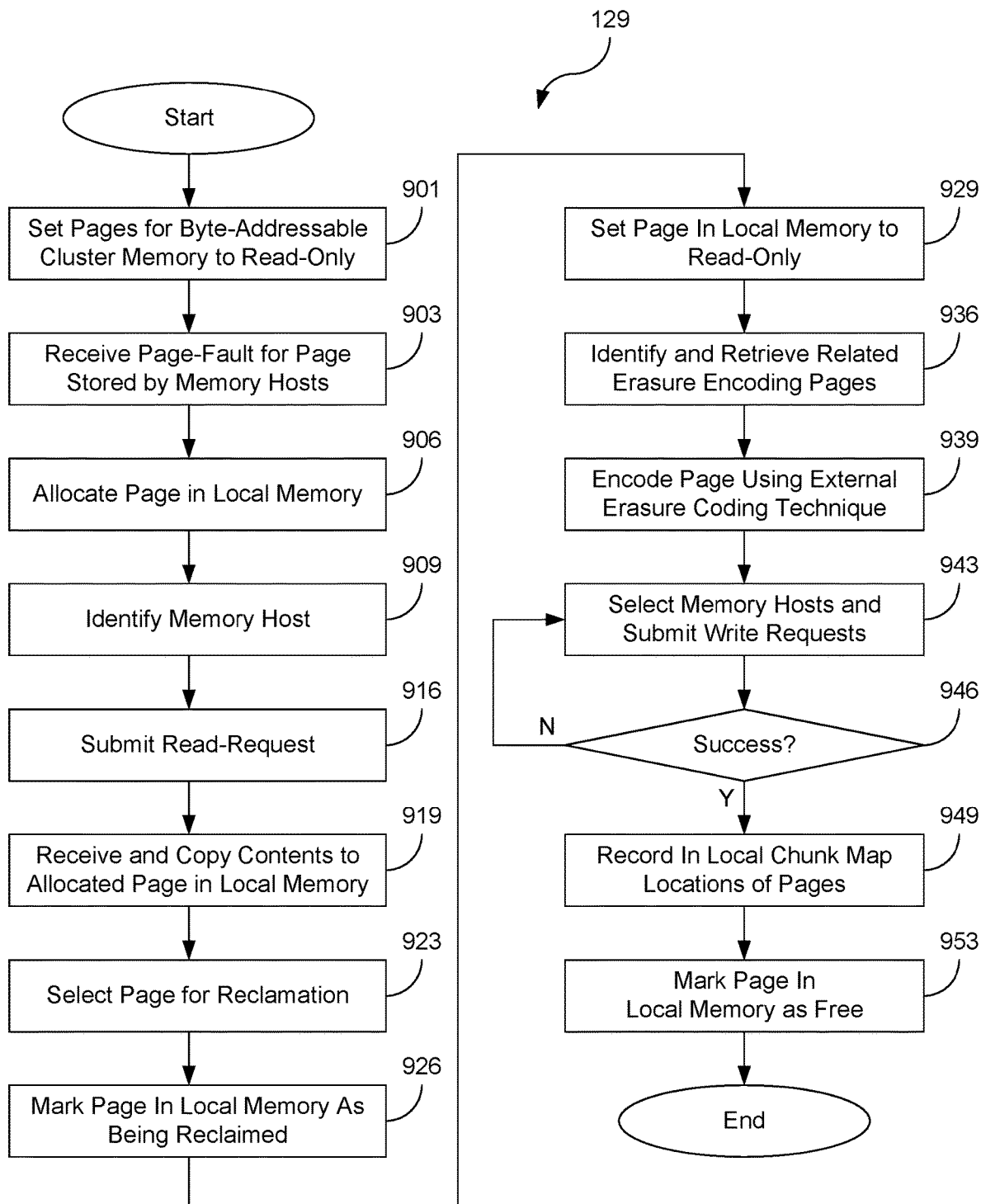
FIG. 9 is a flowchart illustrating one example of functionality implemented as portions of an application executed in the network environment of FIG. 1 according to various embodiments of the present disclosure.

Referring next to FIG. 9, shown is a flowchart that provides one example of the operation of a portion of the operating system 129 in order to reclaim pages stored in the local memory 126 and copy them to memory hosts 106 that provide byte-addressable cluster memory 116. The flowchart of FIG. 9 provides merely an example of the many different types of functional arrangements that can be employed to implement the operation of the depicted portion of the operating system 129 of the local host 103. As an alternative, the flowchart of FIG. 9 can be viewed as depicting an example of elements of a method implemented within the network environment 100.

Beginning at block 901, the operating system 129 can set one or more pages of byte addressable cluster memory 116 to read-only or write-protected status. This can prevent the local host 103 from writing to the byte addressable pages in the cluster memory 116 of the memory hosts. Should the local host 103 attempt to write to a page of memory stored in the byte addressable cluster memory 116, then a page-fault will occur.

Then, at block 903, the operating system 129 can receive a page-fault for a page stored in the byte addressable cluster memory 116 of the memory hosts 106. For example, a process executing on the local host 103 could have attempted to save data to or update the page stored in the byte addressable cluster memory 116.

Next, at block 906, the operating system 129 can allocate a page in the local memory 126 for the page stored in the byte-addressable cluster memory of the memory host 106. For example, the operating system 129 could allocate a free or otherwise available page in the local memory 126. As another example, the operating system could evict or otherwise reclaim a page in the local memory 126 for the page stored by the memory hosts 106.

Then, at block 909, the operating system 129 can identify the memory host 106 that is storing the page that includes the byte-addressable cluster memory 116 address that was the source of the page-fault. For example, the operating system 129 could search the local chunk map 133 to identify the memory host 106 and chunk 123 of memory allocated to the local host 103. The operating system 129 could then send a request to the memory host 106 for the page within the chunk 123 of the cluster memory 116 containing the memory address.

Proceeding to block 916, the operating system 129 can submit a read request to the memory host 106 to retrieve the page stored by the memory host 106. Assuming that the read request is successful, the process can proceed to block 919. However, it is possible that the operating system 129 could receive an exception in response to the read request submitted at block 916, such as a machine-check exception or page-fault exception. If an exception is received, this could indicate that the memory host 106 is in a faulted state (e.g., the memory host 106 no longer has a copy of the page, or the memory host 106 is unreachable). In response to an exception, operating system 129 could repeat blocks 909 and 916 to identify another memory host 106 containing a copy of the page that includes the byte-addressable cluster memory 116 address that was the source of the page-fault received at block 903 and submit a read-request to the subsequent memory host 106.

Then, at block 919, the operating system 129 can receive the contents of the page stored by the memory host 106 and copy the contents to the page in the local memory 126. The operating system 129 can then update the page table to reflect the allocation of the page in the local memory 126. As a result, the process that first attempted to write to the read-only address in the byte-addressable cluster-memory 116 can now write to the local memory 126 location.

Moving on to block 923, the operating system 129 can select the page copied from the byte-addressable cluster memory 116 to the local memory 126 for reclamation. This could occur in response to a need for additional memory for another process. The operating system 129 could use various benchmarks, such as how frequently the page is read from or written to, how long it has been since the page was last read from or written to, in order to determine whether to select the page for reclamation.

Next at block 926, the operating system 129 can mark the page in the local memory 126 as being reclaimed. However, while the page in the local memory 126 is marked as being reclaimed, it remains allocated and therefore available to processes executing on the local host 103.

Therefore, at block 929, the operating system 129 can then set the page in the local memory 126 that is being reclaimed to a read-only state. This can be done, for example, to prevent the contents of the page from being modified while it is being copied to the memory hosts 106. Setting the local page to read-only will generally be architecture dependent. Furthermore, some architectures may require flushing the translation lookaside buffer to ensure the read-only setting is visible.

Proceeding to block 936, the operating system 129 can then identify any additional pages related to the page in the local memory 126 that is being reclaimed. For example, if the page in the local memory 126 had been previously stored in a cluster memory 116 of a memory host 106, the operating system 129 could reference a local chunk map 133 to identify related pages or parity pages that were encoded together using an external erasure coding technique. As another example, if the page in the local memory 126 is not related to associated with any other pages or parity pages for erasure encoding purposes, then the operating system 129 could select additional pages that were similarly unrelated or unassociated with other pages or parity pages for erasure encoding purposes. This could occur, for example, if the page had not been previously stored in the cluster memory 116 of a memory host 106, and therefore had not been subject to an erasure coding technique. In such a situation, the operating system 129 could identify other pages in the local memory 126 that were being evicted to the memory hosts 106 for the first time to use for a subsequent erasure encoding.

Then, at block 939, the operating system 129 can encode the page using an external erasure coding technique. For example, the operating system 129 could generate one or more parity pages based at least in part on the page being reclaimed from the local memory 126 and the additional pages identified at block 636.

Next, at block 943, the operating system 129 can then select memory hosts 106 and submit write requests to the memory hosts 106 to store copies of the pages and parity pages encoded together at block 639. The memory hosts 106 can be selected from those memory hosts 106 identified in a local chunk map 133 that tracks which memory hosts 106 have allocated chunks 123 of cluster memory 116 to the local host 103 and which chunks 123 of cluster memory 116 have sufficient space to store a copy of the page of the local memory 126. In some implementations, the operating system 129 can further specify whether a page or parity page is to be stored in the cluster memory 116 of a memory host 106 or on a disk 119 of the memory host 106. In addition, the operating system 129 could, in some instances, select memory hosts 106 that had previously stored a copy of one of the pages or parity pages. This could be done, for example in order to overwrite a previous version of one of the pages. Alternatively, the operating system 129 could submit write requests to selected memory hosts 106 and also submit requests to one or more memory hosts 106 to free previously stored versions of the pages and parity pages.

Moving on to block 946, the operating system 129 can wait to receive confirmations from the respective memory hosts 106 that the write requests submitted at block 943 were successful. If all of the write requests were successful, then the process can proceed to block 949. However, if one or more write requests were unsuccessful, the process could return to block 943 so that a new memory host 106 could be selected to store a copy of the respective page or parity page.

Proceeding to block 949, the operating system 129 can then record in the local chunk map 133 where the respective pages or parity pages were stored among the memory hosts 106. The operating system 129 can also record in the local chunk map 133 which pages and parity pages are related stored by the memory hosts 106 are related to each other. Accordingly, the records in the local chunk map 133 can include an identifier for the memory host 106, an indicator as to whether the page or parity page was stored in a chunk 123 of the cluster memory 116 or to a disk 119 of the memory host 106, an identifier of the chunk 123 used to store the page, a memory offset indicating the location within the chunk 123 where the page is stored, and a unique identifier that identifies a group of related pages and parity pages.

Then, at block 953, the operating system 129 can mark the page as free in the local memory 126. Some architectures may require flushing the translation lookaside buffer to ensure the free marking is visible. The page can then be reused or reallocated by the virtual memory manager of the operating system 129 when needed.

After the page is marked as read-only at block 933, it is possible that the local host 103 could attempt to write to the page in the local memory 126 before the page has been freed at block 953. Should a write attempt occur while the page is in the read-only state, a page-fault will occur and the page-fault handler of the virtual memory manager of the operating system 129 will wait for reclamation to complete before allowing the write to occur. Once the page is then freed at block 953, the page-fault handler can read the page from one of the memory hosts 106 back into the local memory 126. Alternatively, as an optimization, the page-fault handler can reuse the page that has been freed from the local memory in order to save bandwidth by avoiding a read of the page from the memory host 106, provided the page in the local memory 126 has not been allocated for another purpose. Another optimization which can be used in addition to the previous optimization is for the page-fault handler to abort the reclamation process of FIG. 9 to save bandwidth.

Performance Enhanced Byte-Addressable Cluster Memory

Although byte-addressable cluster memory 116 is convenient for the local host 103 to utilize when additional memory resources are desired, byte-addressable cluster memory 116 does have a number of disadvantages compared to local memory 126. Generally, the interconnect between the local host 103 and the memory hosts 106 has less bandwidth than the interconnect between the processor of the local host 103 and the local memory 126 of the local host 103. In addition, the interconnect between the local host 103 and the memory hosts 106 has higher latency than the interconnect between the processor of the local host 103 and the local memory 126 of the local host 103. To improve the performance of byte-addressable cluster memory 116, various embodiments of the present disclosure may periodically move pages from the local memory 126 of the local host 103 to the byte-addressable memory 116 of the memory host 106 and vice versa. This can be done in order to maximize the usage of higher-performing local memory 126 by processes executing on the local host 103.

Figure 10:
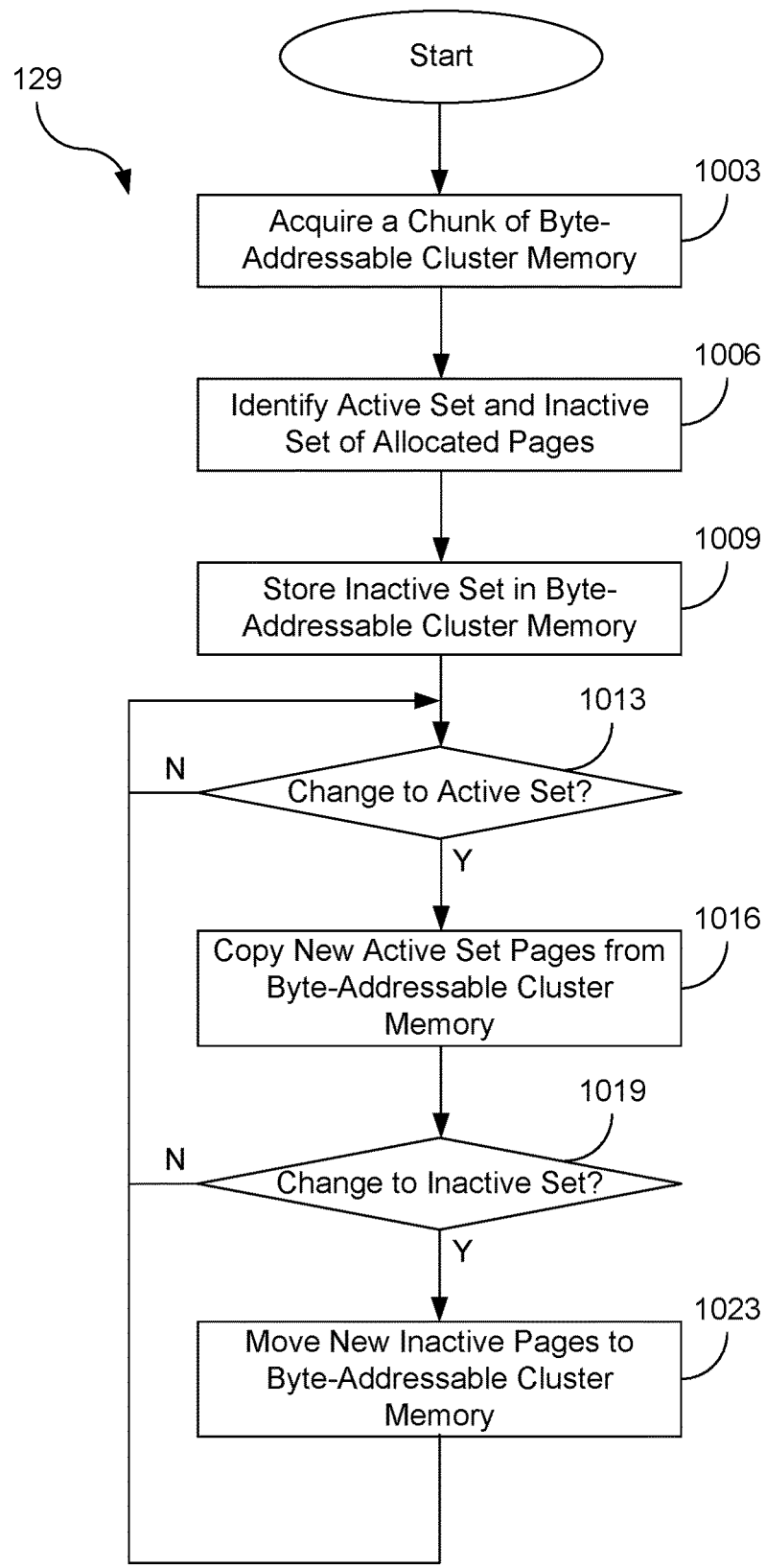
FIG. 10 is a flowchart illustrating one example of functionality implemented as portions of an application executed in the network environment of FIG. 1 according to various embodiments of the present disclosure.

Referring next to FIG. 10, shown is a flowchart that provides one example of the operation of a portion of the operating system 129 according to various embodiments of the present disclosure. The flowchart of FIG. 10 provides merely an example of the many different types of functional arrangements that can be employed to implement the operation of the depicted portion of the operating system 129. As an alternative, the flowchart of FIG. 10 can be viewed as depicting an example of elements of a method implemented within the network environment 100.

Beginning with block 1003, the operating system 129 can acquire a chunk 123 of the byte-addressable cluster memory 116 for use by the local host 103. To avoid race conditions, wherein a chunk 123 of the byte-addressable cluster memory 116 might be claimed by multiple local hosts 103, one of several approaches could be used. In a first approach, an allocation structure could be maintained by the memory host 106. The allocation structure could contain a Boolean value for each chunk 123 of the byte-addressable cluster memory 116 to indicate whether each chunk 123 is currently available or is currently allocated to a local host 103. The local host 103 could perform an atomic compare-and-swap or similar operation on the allocation structure to mark a chunk 123 of the byte-addressable cluster memory 116 as claimed by the local host 103.

As another example, the local host 103 could send an allocation request to the management agent 136 executed by the management host 109. The management agent 136 could store requests for chunks 123 of byte-addressable cluster memory 116 in a queue. The management agent 136 could review the server chunk map 139 to identify available or unallocated chunks 123 of byte-addressable cluster memory 116. The management agent 136 could then allocate one of the chunks 123 and provide a response to the local host 103 that identifies the memory host 106 and chunk 123 allocated by the management agent 136.

Then, at block 1006, the operating system 129 can identify those pages of the local memory 126 that are currently allocated pages to a process. The operating system 129 can further identify which of the allocated pages are currently being written to or read from (referred to herein as the "active set" of pages), and which of the allocated pages are currently unused (referred to herein as the "inactive set" of pages). The active set and inactive set could be obtained by measuring various page access metrics, such as by including the most recently or most frequently used pages in the active set and by including the least recently or least frequently used pages in the inactive set.

Moving on to block 1009, the operating system 129 can then cause the local host 103 to store the inactive set of pages in the byte-addressable cluster memory 116. This can be done using any of the previously described approaches.

Next, at block 1013, the operating system 129 can periodically determine whether there have been any changes to the active set of pages of local memory 126 used by the process. For example, the operating system 129 could determine which pages were accessed during the current period of time by a process in order to identify the current active set of pages in the local memory 126. This could be done using several approaches. First, the operating system 129 could sample memory accesses by a process by repeatedly interrupting the process and recording the page number of the memory location that was being accessed when the interrupt occurred. The active set would then include all pages that were recorded by at the end of the period as being accessed. Second, some hardware architectures provide an access bit in the page tables, which are set each time the processor accesses data within a page. At the beginning of the period, the operating system 129 could clear the access bit of each page. At the end of the period, the operating system 129 could read the access bit of each page to determine which pages had their access bit set. Those pages which had their access bit set would be members of the active set.

If the operating system 129 determines that the active set of pages has not changed (e.g., that none of the active set of pages are currently stored in the byte-addressable cluster memory 116), then the process at block 1013 can be repeated at another period or interval. However, if the operating system 129 determines that the active set of pages has changed (e.g., that one of the active set of pages is currently located in the byte-addressable cluster memory 116), then the process can proceed to block 1016.

Proceeding to block 1016, the operating system 129 can move, copy, or otherwise transfer the new members of the active set of pages from the byte-addressable cluster memory 116 to the local memory 126. The operating system 129 can use any number of approaches for transferring a page from the byte-addressable cluster memory 116 to the local memory 126 as previously described in the present disclosure.

Then, at block 1019, the operating system 129 can determine whether there have been any changes to the inactive set of pages of local memory 126. For example, the operating system 129 could compare the active set of pages identified in the previous period with the active set of pages identified in the current period to determine whether there had been any changes in the active set. If a page previously included in the active set is no longer accessed with sufficient frequency or has not been accessed recently enough, then the operating system 129 could determine that the page is no longer part of the active set of pages and is instead part of the inactive set of pages in the local memory 126. If the operating system 129 determines that there has been no change to the inactive set of pages, then the process can return to block 1013. However, if the operating system 129 does determine that one or more pages in the active set of pages have now become members of the inactive set of pages, then the process can proceed to block 1023.

Accordingly, at block 1023, the operating system 129 can optionally move any pages of the local memory 126 that are no longer members of the active set (e.g., they have become members of the inactive set) to the byte-addressable cluster memory 116. In some implementations, members of the inactive set may not be immediately transferred to the byte-addressable cluster memory 116 (e.g., if there are sufficient free pages in local memory 126). For example, the operating system 129 could defer transferring pages in the inactive set from local memory 126 to the byte-addressable cluster memory 116 in case the pages become members of the active set of pages again in the near future.

Transfers of pages from local memory 126 to the byte-addressable cluster memory 116 could be done using a variety of approaches. In some implementations, the pages could be copied from the local memory 126 to the byte-addressable cluster memory 116 of a memory host 106. In other implementations, writing the new pages of the inactive set to the byte-addressable cluster memory 116 could be performed using a previously described technique of the various embodiments of the present disclosure. Once the new pages in the inactive set of pages have been moved to the byte-addressable cluster memory 116, the process can return to block 1013.

Figure 11A:
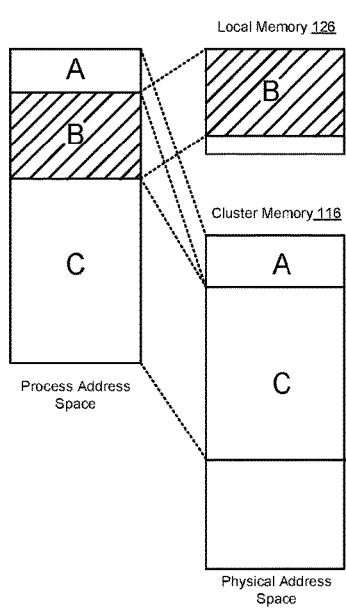
FIGS. 11A-11C are graphical depictions of one implementation of various embodiments of the present disclosure.
Figure 11B:
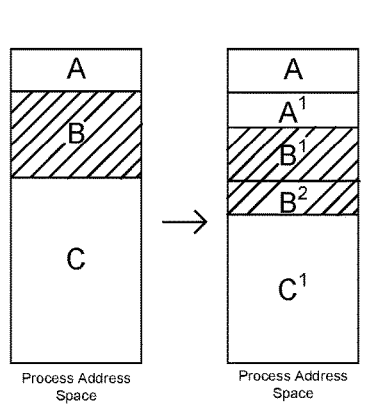
Figure 11C:
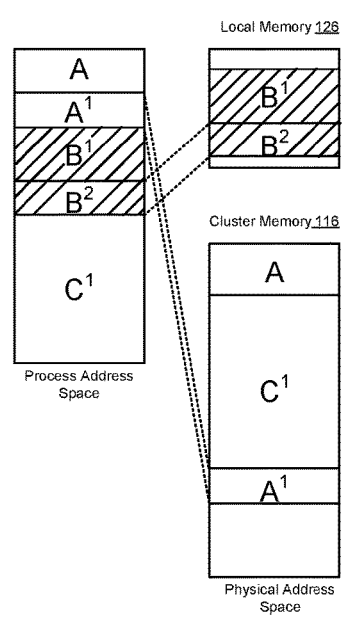

Referring next to FIGS. 11A-C, shown are graphical representations of the movement of pages from the active set to the inactive set over time, and corresponding migrations between the byte-addressable cluster memory 116 and the local memory 126 of the local host 103. As shown in FIG. 11A, a process can consume memory within its address space. At some point in time, part of this memory is the active set, as depicted with diagonal lines and denoted as B, while the rest of the memory is not being actively used (A and C). Accordingly, active set B is mapped into local memory 126, while the inactive set (A and C) are mapped to cluster byte-addressable cluster memory 116. After some time, as illustrated in FIG. 11B, the active set B changes to encompass a different set of pages ($B^1$ and $B^2$), where some pages (e.g., $B^1$) were previously part of the active set of pages and other pages (e.g., $B^2$) are newly included in the active set of pages. Meanwhile, some pages that used to be part of the active set (e.g., $A^1$), are no longer part of the active set. Those previously inactive pages C which continue to be inactive are denoted as $C^1$. Accordingly, as depicted in FIG. 11C, the newly active pages $B^2$ are mapped to local memory 126, while the previously active pages $A^1$ are remapped to byte-addressable cluster memory 116.

Figure 12:
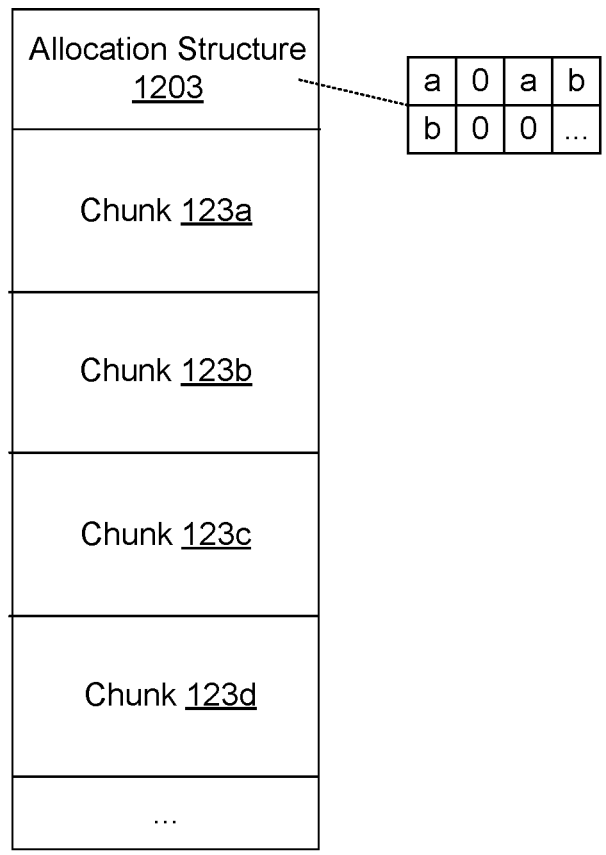
FIG. 12 is a graphical depiction of an allocation structure according to various embodiments of the present disclosure.

For reference, FIG. 12 depicts an example of the allocation structure, as previously discussed. The allocation structure 1203 shown can be used by local hosts 103 (e.g., localhost 103a and localhost 103b) to claim a chunk 123. As previously described, when a local host 103 wishes to allocate a chunk 123, it can find an entry in the array set to a Boolean value of zero (0), and can change that entry to the identifier of the local host 103. When a local host 103 wishes to free a chunk 123 that it previously allocated, it can change the corresponding entry in the array to zero (0). To prevent race conditions, the local host 103 can use atomic operations, such as atomic compare-and-swap. It two local hosts 103 try to execute the same operation on the same array entry at the same time, only one of the local hosts 103 will succeed. Other synchronization primitives, such as load-linked-store-conditional, can also be used.

Figure 13A:
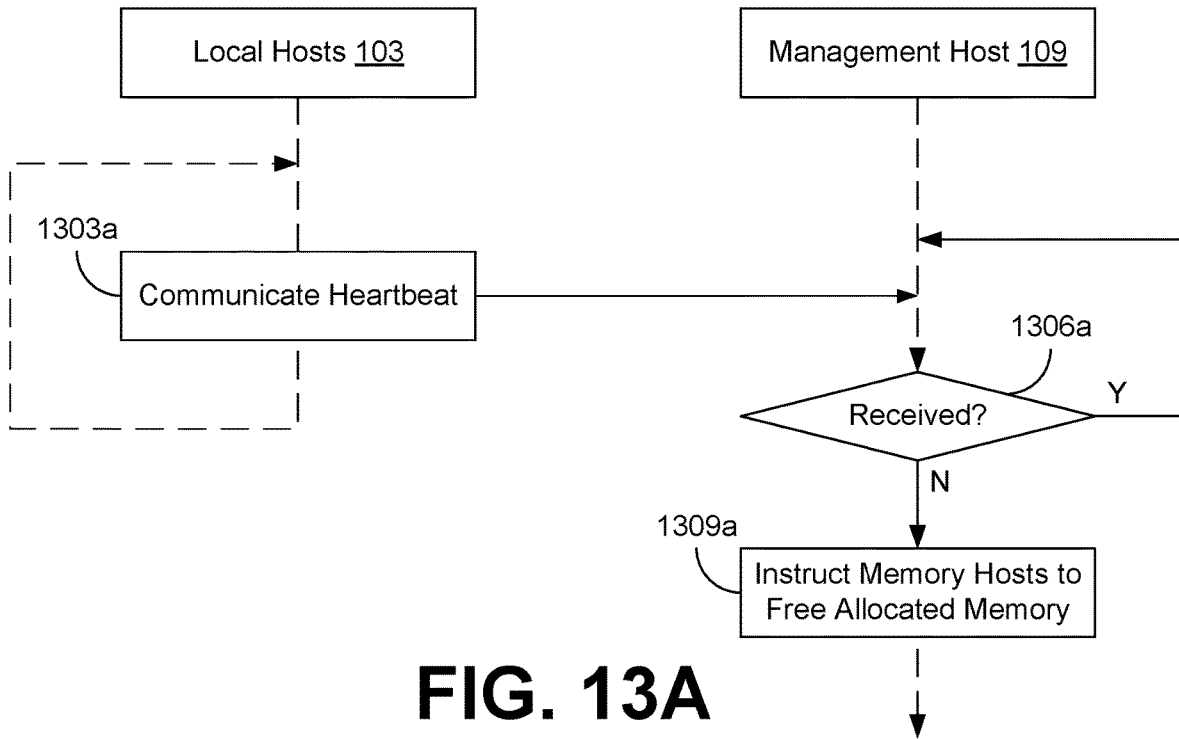
FIGS. 13A and 13B are sequence diagrams illustrating one example of the interaction between components of the network environment of FIG. 1 according to various embodiments of the present disclosure.

FIG. 13A depicts a sequence diagram illustrating a heartbeat mechanism between one or more local hosts 103 and the management host 109. For example, the operating system 129 of a local host 103 could cause the local host 103 to periodically communicate with the management host 109 to indicate that the local host 103 is still operating. For example, the operating system of the local host 103 could send a notification or message to the management host 109 to indicate that the local host 103 is still operating. The management agent 136 executing on the management host 109 could then evaluate the heartbeats in order to determine whether any remedial actions need to be taken.

For example, at block 1303a, the local host 103 could communicate a heartbeat indication to the management host 109 at a periodic interval. This could be performed using a variety of approaches. For example, the local host 103 could periodically update a counter stored either on the local host 103 or the management host 109. As another example, the local host 103 could periodically send a message to the management host 109, receipt of which indicates that the local host 103 is still active. The local host 103 continues to communicate heartbeats until the local host 103 is taken offline (e.g., disconnected from the network 113, powered off, etc.).

Then, at block 1306a, the management host 109 could determine whether the heartbeat communication from the local host 103 had been received. For example, the management agent 136 executing on the management host 109 could determine if the counter had been updated or incremented during the preceding interval. As another example, the management agent 136 could determine whether the management host 109 had received a heartbeat message within a predefined interval of time. If the management host 109 determines that the heartbeat communication has been received, then the process loops back to block 1306a for the next period of time. However, if the management host 109 determines that the heartbeat communication has not been received, then the process proceeds to block 1309a.

Next, at block 1309a, the management host 109 can instruct memory hosts 106 associated with the local host 103 to free any chunks 123 of cluster memory 116 associated with the local host 103 that failed to communicate a heartbeat. For example, the management host 109 could evaluate a server chunk map 139 that identifies the memory host 106 and/or chunks 123 of cluster memory 116 allocated to each local host 103. Using the server chunk map 139, the management host 109 could identify both the memory hosts 106 providing cluster memory 116 resources to the local host 103, but also the specific chunks 123 allocated to the local host 103. The management host 109 could then send a message to the identified memory hosts 106 to free the specified chunks 123 of cluster memory 116. This would allow memory hosts 106 to reclaim cluster memory 116 for other purposes instead of keeping the cluster memory 116 allocated for a local host 103 that was in a faulted state or was otherwise no longer operational.

Figure 13B:
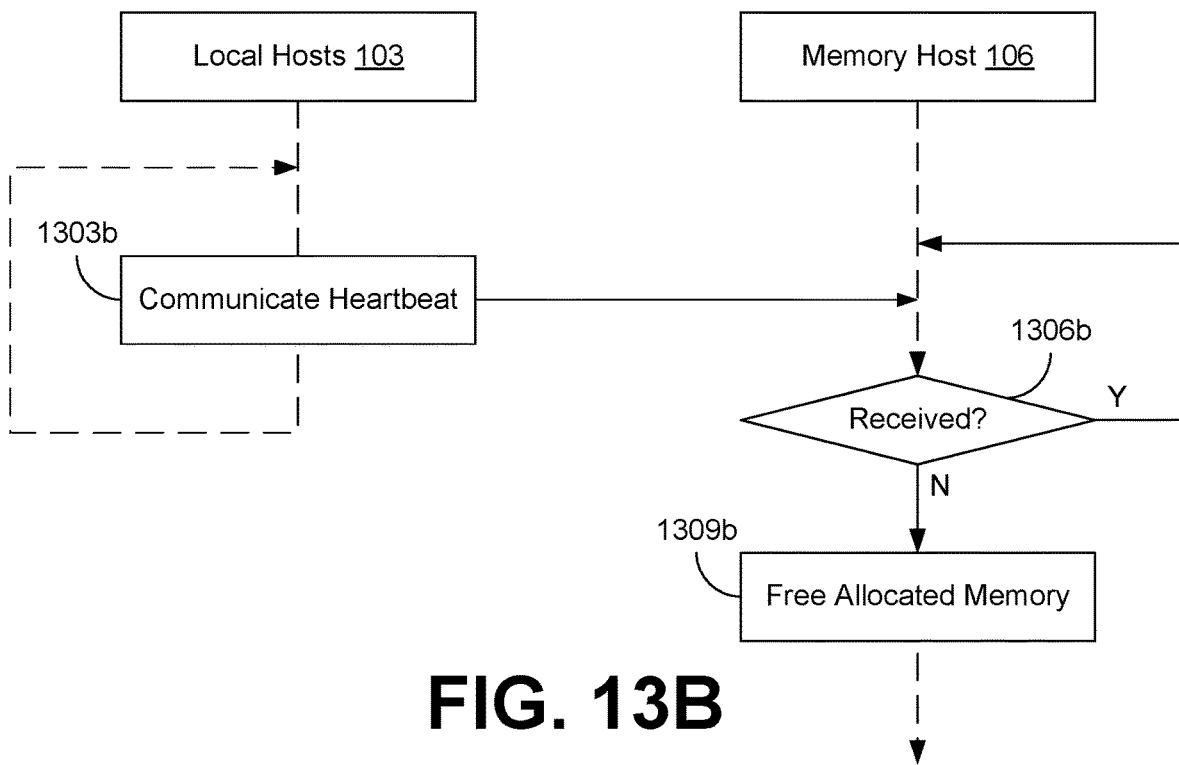

FIG. 13B depicts a sequence diagram illustrating an alternative approach for implementing a heartbeat mechanism. Here, the operating system 129 of a local host 103 could cause the local host 103 to periodically communicate a notification or message to one or more memory hosts 106 identified in the local chunk map 133 as having allocated cluster memory 116 chunks 123 to the local host 103. If the memory hosts 106 notice that they have stopped receiving heartbeat communications from the local host 103, then the memory hosts 106 could free any allocated chunks 123 of cluster memory 116.

For example, at block 1303b, the local host 103 could send a heartbeat to memory hosts 106 at a periodic interval. This could be performed using a variety of approaches. For example, the local host 103 could periodically update a counter stored either on the local host 103 or the memory host 106. As another example, the local host 103 could periodically send a message to the memory host 106, receipt of which indicates that the local host 103 is still active. The local host 103 continues to communicate heartbeats until the local host 103 is taken offline (e.g., disconnected from the network 113, powered off, etc.).

Then, at block 1306b, the memory host 106 could determine whether the heartbeat communication from the local host 103 had been received. For example, the memory host 106 could determine if the counter had been updated or incremented during the preceding interval. As another example, the memory host 106 could determine whether it had received a heartbeat message within a predefined interval of time. If the memory host 106 determines that the heartbeat communication has been received, then the process loops back to block 1306b for the next period of time.

However, if the memory host 106 determines that the heartbeat communication has not been received, then the process proceeds to block 1309b.

Next, at block 1309b, the memory host 106 can free any chunks 123 of its cluster memory 116 allocated to the local host 103. This allows the memory host 106 to reclaim cluster memory 116 for other purposes instead of keeping the cluster memory 116 allocated for a local host 103 that was in a faulted state or was otherwise no longer operational.

Figure 14:
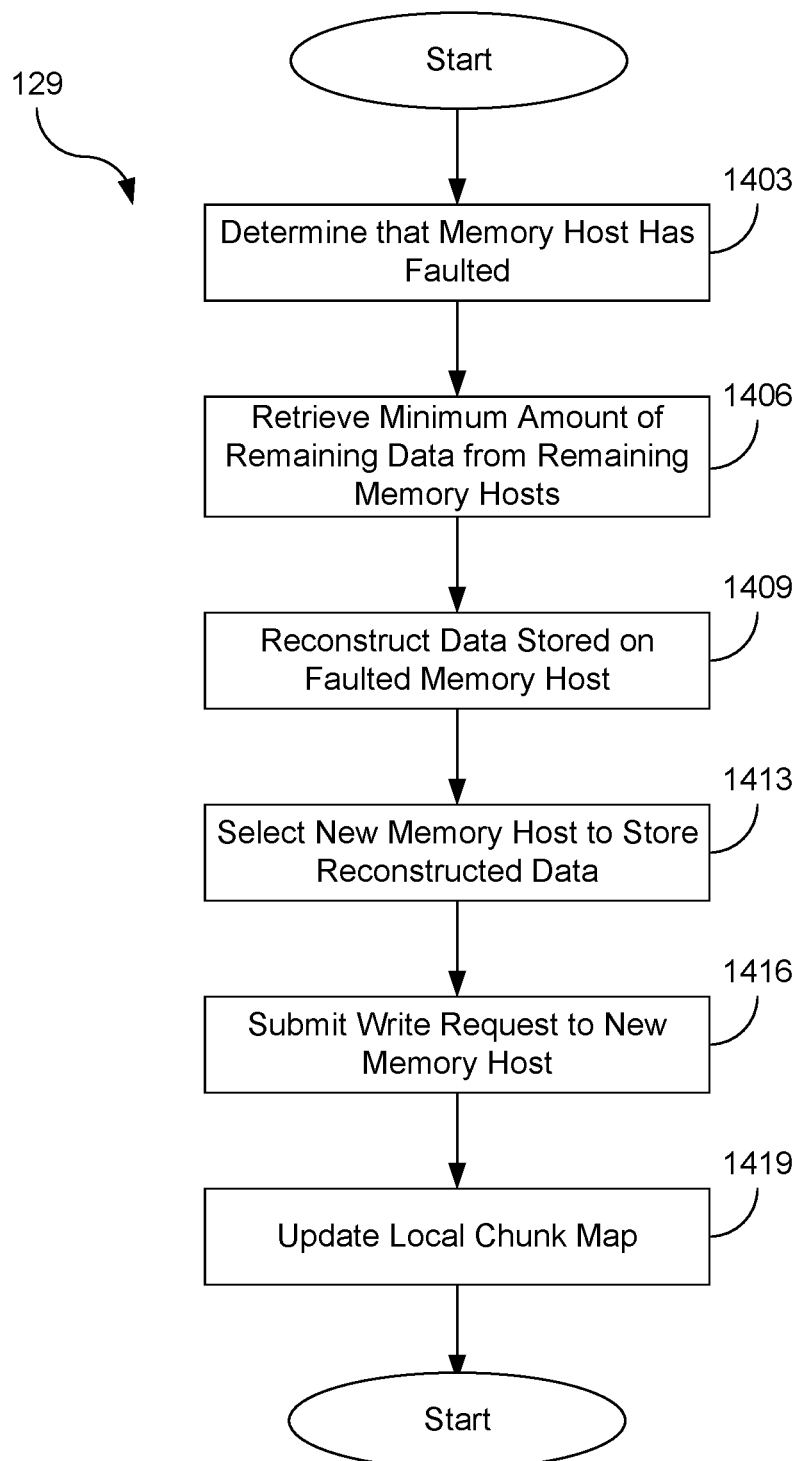
FIG. 14 is a flowchart illustrating an example of functionality implemented as portions of an application executed in the network environment of FIG. 1 according to various embodiments of the present disclosure.

Referring next to FIG. 14, shown is a flowchart that provides one example of the operation of a portion of the operating system 129 according to various embodiments of the present disclosure. The flowchart of FIG. 14 provides merely an example of the many different types of functional arrangements that can be employed to implement the operation of the depicted portion of the operating system 129. However, the process depicted in the flowchart of FIG. 14 could be performed in whole or in part by any background process executed by the local host 103. Accordingly, the flowchart of FIG. 14 can be viewed as depicting an example of elements of a method implemented within the network environment 100.

To begin, at block 1403 the operating system 129 could determine that a memory host 106 that has allocated a chunk 123 of cluster memory 116 to the local host 103 has faulted. The fault could represent that the memory host 106 has gone offline, has lost power, has halted execution (e.g., due to a hardware failure or software crash), or is otherwise unavailable to the local host 103. The determination could be made using a variety of approaches. For example, the determination could be made because the local host 103 has attempted to read from or write to the cluster memory 116 allocated by the memory host 106, but the read or write failed. As another example, the management agent 136 executed by the management host 109 could employ a heartbeat process with the memory hosts 106 similar to the process described in FIGS. 13A and 13B. If the management agent 136 determines that a memory host 106 is no longer providing or communicating a heartbeat or has missed a heartbeat, the management agent 136 could cause the management host 109 to notify the local host 103 that the memory host 106 is no longer available. Similarly, the memory host 106 could be providing or communicating heartbeat signals to the local host 103 and the local host 103 could determine that it has failed to receive a heartbeat signal or a heartbeat communication from the memory host 106 within a preceding period of time. Accordingly, the operating system 129 could attempt to reconstruct a page stored in allocated chunk 123 of cluster memory 116 provided by the memory host 106.

Therefore, at block 1406, the operating system 129 could cause the local host 103 to retrieve a minimum amount of data from the remaining memory hosts 106 in order to reconstruct any data stored on the faulted memory host 106. For example, the operating system 129 could evaluate the local chunk map 133 to identify chunks 123 of cluster memory 116 allocated on other memory hosts that contained related pages, parity pages, subpages or parity subpages. The operating system 129 could then cause the local host 103 to retrieve the minimum number of related pages, parity pages, subpages or parity subpages necessary to reconstruct the data previously stored on the faulted memory host 106.

Then, at block 1409, the operating system 129 can reconstruct the data lost from the faulted memory host 129 using any of the previously described internal or external erasure coding techniques.

Next, at block 1413, the operating system 129 can select a new memory host 106 to store the reconstructed data. For example, the operating system 129 could select a memory host 106 from the plurality of memory hosts 106 that has not yet allocated a chunk 123 of cluster memory 116 to the local host 103. This could be done by referencing the local chunk map 133 and determining which memory hosts 106 are not currently listed in the local chunk map 133. The operating system 129 could then send an allocation request to the memory host 106 to allocate a chunk 123 of the cluster memory 116 using previously described techniques. As an alternative, the operating system 129 could cause the local host 103 to send a request to the management host 109 to allocate a new chunk 123 of cluster memory 116 on a new memory host 106.

Subsequently, at block 1416, the operating system 129 can submit a write request to the newly selected memory host 106. The write request can specify or include the data reconstructed at block 1409. In some instances, the write request can also specify whether and/or where to store the data reconstructed at block 1409 in the cluster memory 116 or the disk 119 of the memory host 106.

Finally, at block 1419, the operating system 129 can update the local chunk map 133 to reflect the data written to the new memory host 106 selected at box 1413. The update can include an identifier of the memory host 106, the chunk 123 in the cluster memory 116 or the disk 119, and identify any related pages, subpages, parity pages, or parity subpages. Once the local chunk map 133 is updated, the reconstruction process can end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
      generate at least one parity subpage for a respective one of a plurality of subpages of a local page in response to a change to the local page;
      submit a write request for each of the plurality of subpages to a respective one of a plurality of memory hosts; and
      submit an additional write request for the at least one parity subpage to an additional one of the plurality of memory hosts.

2. The system of claim 1, wherein the machine-readable instructions, when executed by the processor, further cause the computing device to at least:
   determine that one of the plurality of memory hosts storing at least one of the plurality of subpages or the at least one parity subpage has faulted;
   retrieve a minimum number of remaining subpages from the combination of the plurality of subpages and the at least one parity page; and
   reconstruct a missing subpage or parity subpage from the minimum number of remaining subpages.

3. The system of claim 2, wherein the machine-readable instructions, when executed by the processor, further cause the computing device to at least:
   select a new memory host to store the missing subpage or parity subpage; and
   submit a third write request to the new memory host for the missing subpage or parity subpage.

4. The system of claim 1, wherein the machine-readable instructions, when executed by the processor, further cause the computing device to at least:
   in response to a page-fault, retrieve a minimum number of subpages from the combination of the plurality of subpages and the at least one parity page;
   reconstruct the local page based at least in part on the minimum number of subpages; and
   load the local page into the memory of the computing device.

5. The system of claim 1, wherein the machine-readable instructions, when executed by the processor, further cause the computing device to at least record in a local chunk map the chunks in which the plurality of subpages and the at least one parity page are stored and the offsets within the chunks in which the plurality of subpages and the at least one parity subpage are stored.

6. The system of claim 1, wherein the additional write request for the at least one parity subpage to the additional one of the plurality of memory hosts specifies that the at least one parity subpage is to be stored on a disk of the additional one of the plurality of memory hosts.

7. The method implemented with the computer of claim 1, wherein the machine-readable instructions, when executed by the processor, further cause the computing device to at least communicate a heartbeat to the plurality of memory hosts.

8. A method, comprising:
   generating at least one parity subpage for a respective one of a plurality of subpages of a local page in response to a change to the local page;
   submitting a write request for each of the plurality of subpages to a respective one of a plurality of memory hosts; and
   submitting an additional write request for the at least one parity subpage to an additional one of the plurality of memory hosts.

9. The method of claim 8, further comprising:
   determining that one of the plurality of memory hosts storing at least one of the plurality of subpages or the at least one parity subpage has faulted;
   retrieving a minimum number of remaining subpages from the combination of the plurality of subpages and the at least one parity page; and
   reconstructing a missing subpage or parity subpage from the minimum number of remaining subpages.

10. The method of claim 9, further comprising:
selecting a new memory host to store the missing subpage or parity subpage; and
submitting a third write request to the new memory host for the missing subpage or parity subpage.

11. The method of claim 8, further comprising:
in response to a page-fault, retrieving a minimum number of subpages from the combination of the plurality of subpages and the at least one parity page;
reconstructing the local page based at least in part on the minimum number of subpages; and
loading the local page into the memory of the computing device.

12. The method of claim 8, further comprising recording in a local chunk map the chunks in which the plurality of subpages and the at least one parity page are stored and the offsets within the chunks in which the plurality of subpages and the at least one parity subpage are stored.

13. The method of claim 8, wherein the additional write request for the at least one parity subpage to the additional one of the plurality of memory hosts specifies that the at least one parity subpage is to be stored on a disk of the additional one of the plurality of memory hosts.

14. The method of claim 8, further comprising communicating a heartbeat to the plurality of memory hosts.

15. A non-transitory, computer-readable medium comprising machine-readable instructions that, when executed by a processor of a computing device, cause the computing device to at least:
generate at least one parity subpage for a respective one of a plurality of subpages of a local page in response to a change to the local page;
submit a write request for each of the plurality of subpages to a respective one of a plurality of memory hosts; and
submit an additional write request for the at least one parity subpage to an additional one of the plurality of memory hosts.

16. The non-transitory, computer-readable medium of claim 15, wherein the machine-readable instructions, when executed by the processor, further cause the computing device to at least:
determine that one of the plurality of memory hosts storing at least one of the plurality of subpages or the at least one parity subpage has faulted;
retrieve a minimum number of remaining subpages from the combination of the plurality of subpages and the at least one parity page; and
reconstruct a missing subpage or parity subpage from the minimum number of remaining subpages.

17. The non-transitory, computer-readable medium of claim 16, wherein the machine-readable instructions, when executed by the processor, further cause the computing device to at least:
select a new memory host to store the missing subpage or parity subpage; and
submit a third write request to the new memory host for the missing subpage or parity subpage.

18. The non-transitory, computer-readable medium of claim 15, wherein the machine-readable instructions, when executed by the processor, further cause the computing device to at least:
in response to a page-fault, retrieve a minimum number of subpages from the combination of the plurality of subpages and the at least one parity page;
reconstruct the local page based at least in part on the minimum number of subpages; and
load the local page into the memory of the computing device.

19. The non-transitory, computer-readable medium of claim 15, wherein the machine-readable instructions, when executed by the processor, further cause the computing device to at least record in a local chunk map the chunks in which the plurality of subpages and the at least one parity page are stored and the offsets within the chunks in which the plurality of subpages and the at least one parity subpage are stored.

20. The non-transitory, computer-readable medium of claim 15, wherein the machine-readable instructions, when executed by the processor, further cause the computing device to at least communicate a heartbeat to the plurality of memory hosts.

* * * * *